INVENTOR
*RICHARD M. SANDERS*

BY *Griffin and Stokes*
ATTORNEYS

Jan. 10, 1967  R. M. SANDERS  3,298,000
CHARACTER CORRELATION SYSTEM
Filed Oct. 31, 1963  6 Sheets-Sheet 2
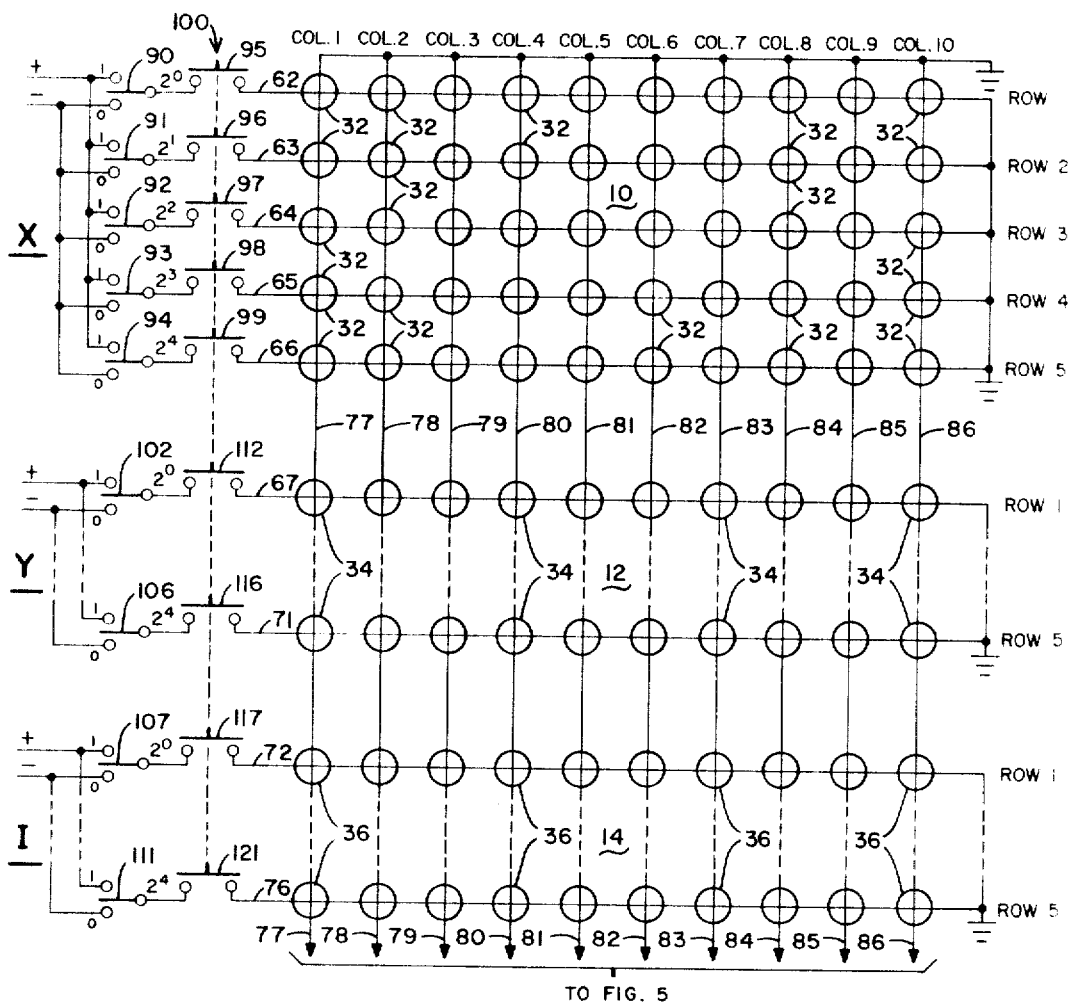
*Fig. 2*
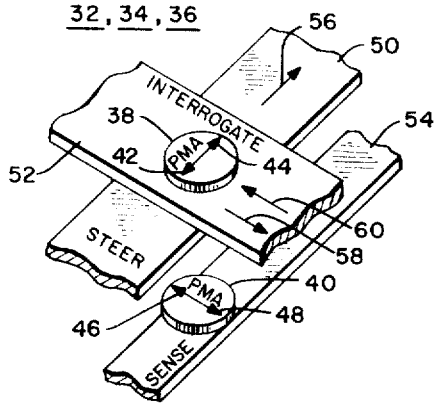
*Fig. 3*
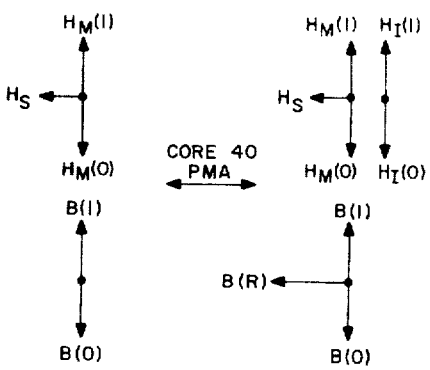
*Fig. 4A*  *Fig. 4B*

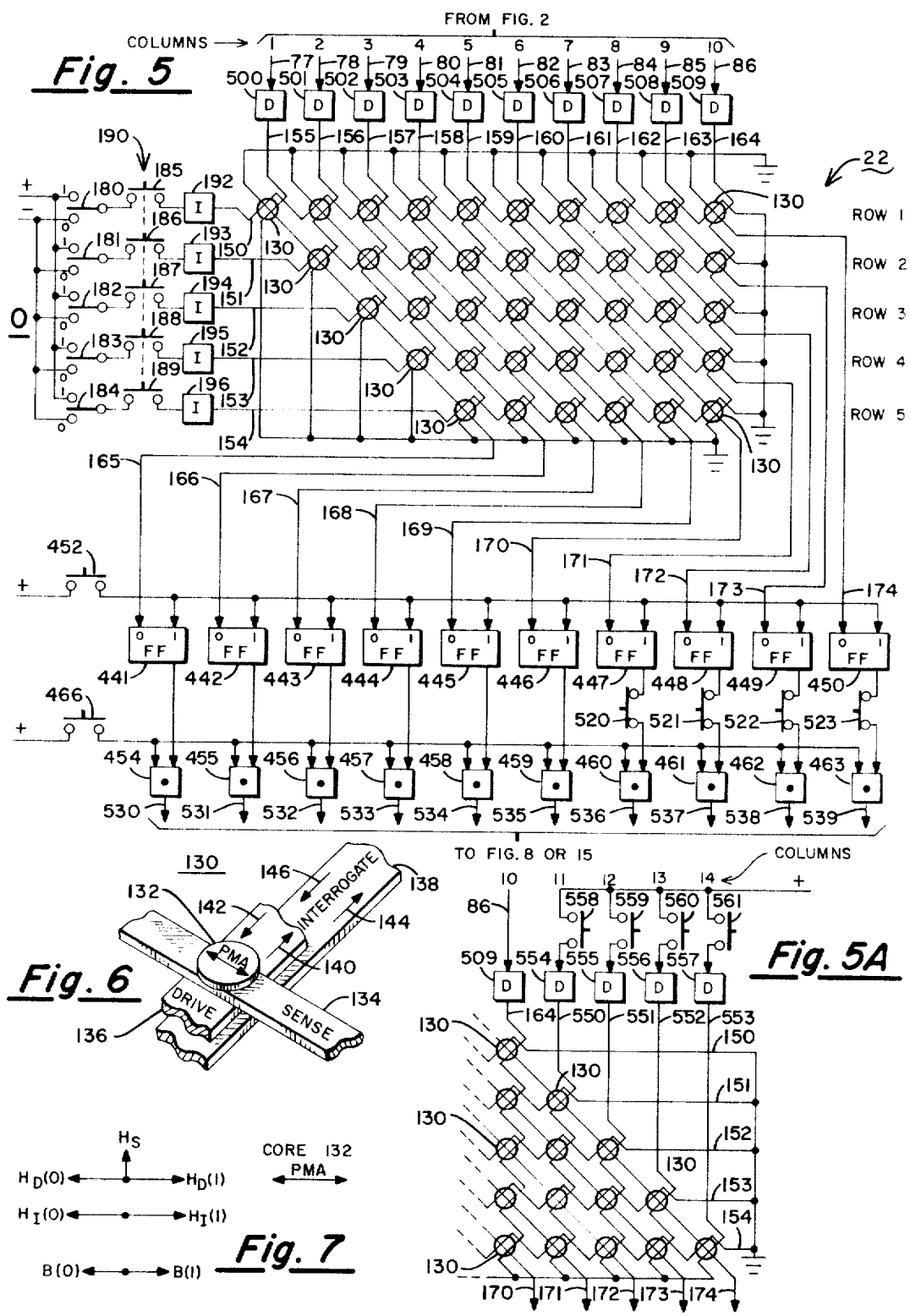

Jan. 10, 1967 R. M. SANDERS 3,298,000
CHARACTER CORRELATION SYSTEM
Filed Oct. 31, 1963 6 Sheets-Sheet 4

United States Patent Office 3,298,000
Patented Jan. 10, 1967

3,298,000
CHARACTER CORRELATION SYSTEM
Richard M. Sanders, St. Paul, Minn., assignor to Sperry Rand Corporation, New York, N.Y., a corporation of Delaware
Filed Oct. 31, 1963, Ser. No. 320,339
39 Claims. (Cl. 340—172.5)

This invention relates to a character correlation system for allowing the rapid determination of a variety of combinations occurring in a sequence or string of characters, or between strings of characters, by providing specialized circuitry for performing character-correlation counting operations in parallel that were formerly done by non-specialized circuitry in series.

The character correlation system of the present invention utilizes a search memory, a coincidence matrix, and a bank of counters to perform counting functions for relations between characters. The set of characters may include alphabetic, punctuation, numeric, or special significant types. A sequence or a string of characters may contain a plurality of types or only one type. Relationships between characters of the same sequence may be ascertained or, alternatively, a plurality of strings of characters may be analyzed for relationships between characters of different strings. Character sequences may be analyzed for a large variety of functions in but a few cycles per function due to the parallel organization of the system. Plural strings can be analyzed for functions in a number of cycles equal to some small multiple of the number of characters in the set. Strings containing more characters than the number of locations in the search memory can be analyzed by reloading the memory with different segments, possibly overlapping of the whole string. The system output is a count of the occurrence of the specified character relation within the two strings. To give but one function for which analysis is possible in the present system, the number of alphabetic character pairs (or digraphs) can be determined which are contained within a single character string, either starting at all positions or starting at only odd or even positions. If two character strings are being simultaneously analyzed, the problem may be to count the coincidences of a particular character sequence in a first string with a second character sequence in the second string. The invention also may be useful in document reading and pattern recognition systems between various portions of symbols. Other illustrations of the uses to which the present invention may be put are given in subsequent paragraphs of the description to follow.

Therefore, one object of the present invention is to provide a character correlation system which operates in parallel upon the characters of a sequence or sequences so as to substantially reduce the time required for analysis.

A further object of the present invention is to provide a character correlation system comprising a search memory for holding a plurality of characters at different locations thereof, means for simultaneously interrogating all of the search memory locations for the presence of the same particular character in order to generate signals indicative of character finds in the memory, a coincidence matrix for comparing the character find signals in several shifted positions against one or more reference signals, and a bank of counters for counting the number of coincidences determined by the coincidence matrix.

Although the inventive logical organization of the present invention may be implemented through the use of various types of components, a novel use has been made of thin magnetic film circuitry in order both to increase operating component speed and to eliminate the need for much circuitry which might otherwise be required for other kinds of components. The preferred novel embodiment of the present invention therefore employs thin film circuitry in the search memory, coincidence matrix, and counter bank which are so coupled together as to provide a compact and relatively simple structure.

Another object of the present invention is to provide a character correlation system constructed for the most part of magnetic thin film circuitry.

A further object of the present invention is to provide a novel magnetic thin film counter bank for the system wherein each counting register may be simultaneously incremented or decremented through use of but one set of control pulses.

These and other objects of the present invention will become apparent during the course of the following description to be read in view of the drawings, in which:

FIGURE 2 shows a magnetic thin film search memory organization;

FIGURE 3 shows the arrangement of each bicore element in the search memory;

FIGURES 4A and 4B are vector diagrams illustrating the operation of a search memory element;

FIGURE 5 shows a magnetic thin film coincidence matrix;

FIGURE 5A shows an alternative embodiment of the coincidence matrix;

FIGURE 6 shows the arrangement of each element in the coincidence matrix;

FIGURE 7 is a vector diagram illustrating the operation of a coincidence matrix element;

Figure 18:
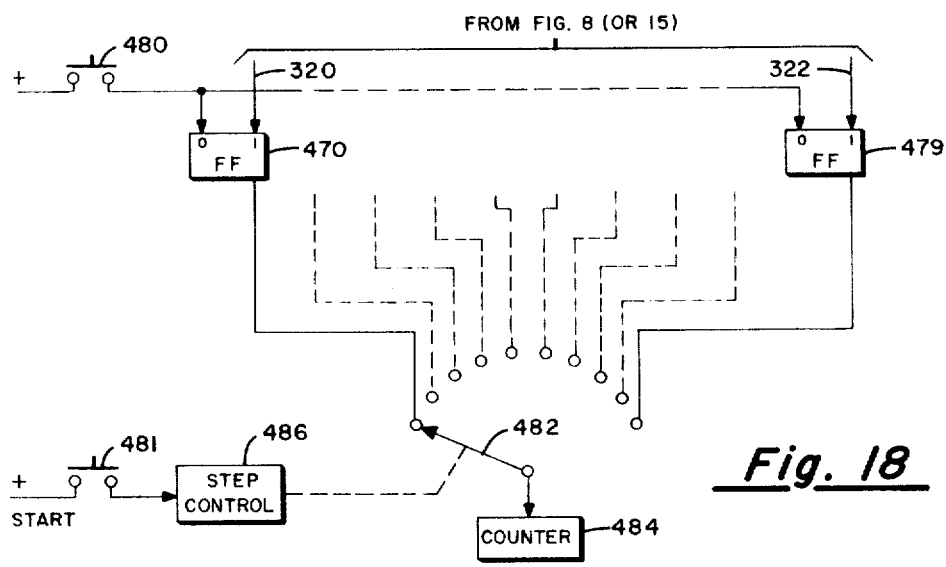
Figure 8:
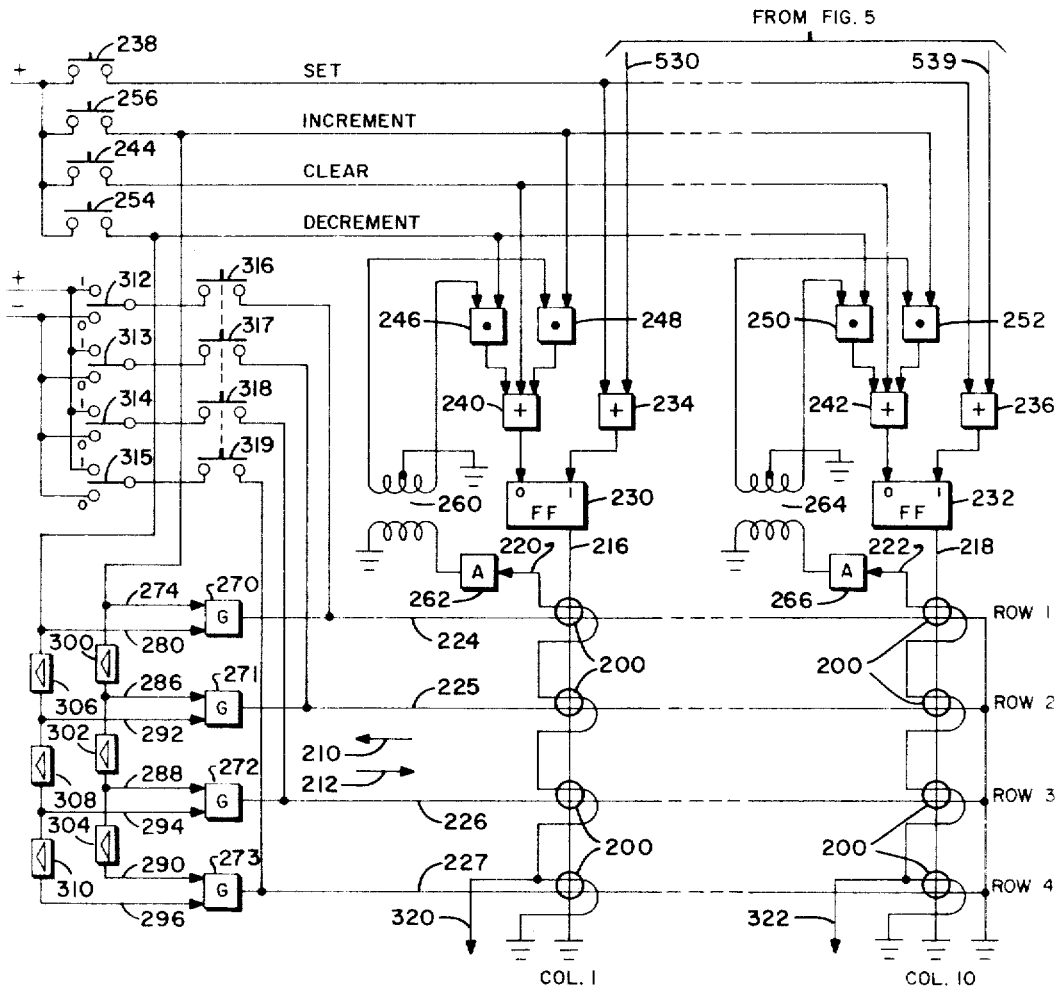
FIGURE 8 shows one preferred embodiment of a magnetic thin film counter bank.
Figure 10:
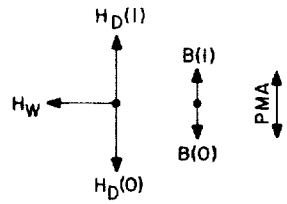
Figure 11:
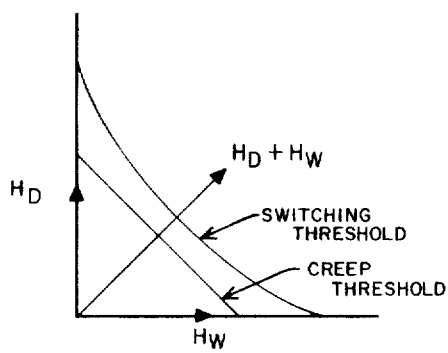
Figure 12:
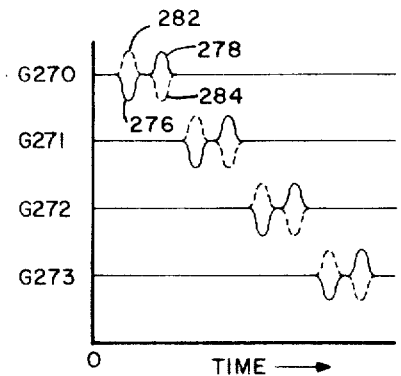
Figure 13:
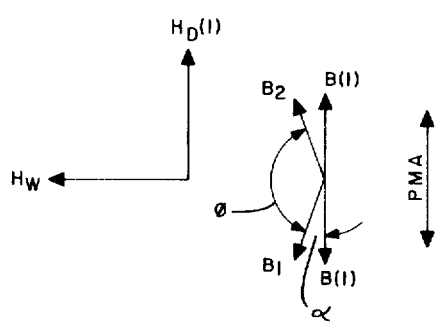
Figure 14A:
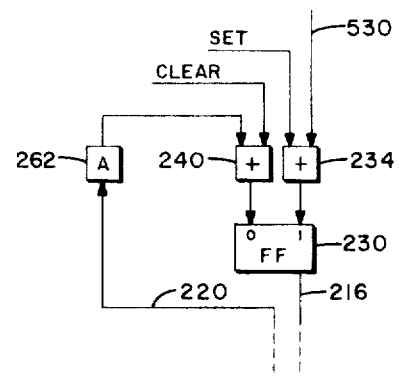
Figure 14B:
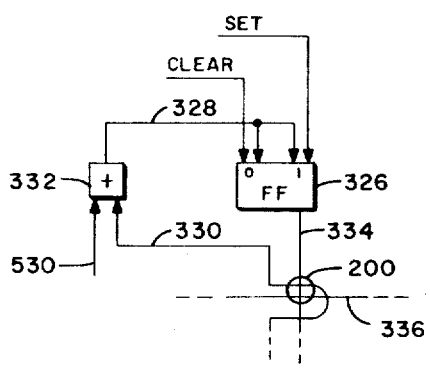
Figure 14C:
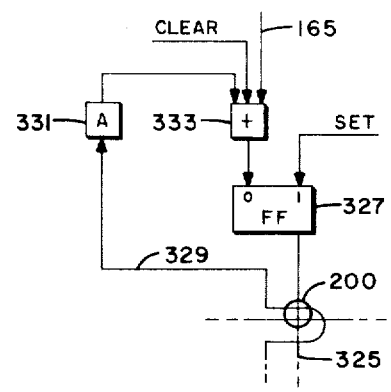
Figure 15:
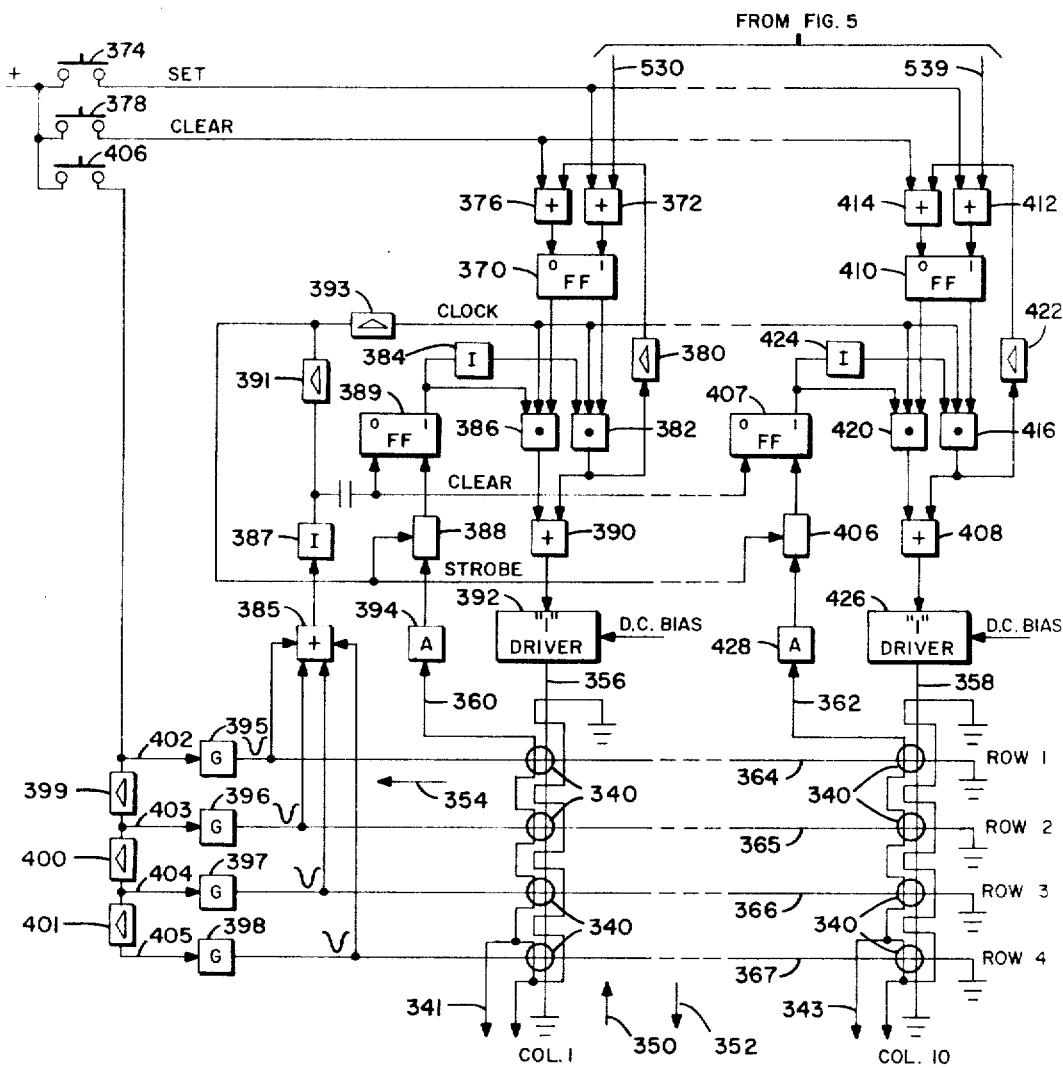
Figure 16:
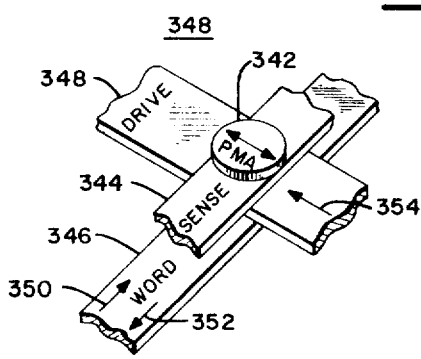
Figure 17:
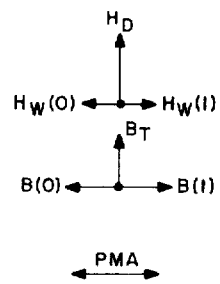

FIGURES 10, 11, and 13 are vector diagrams illustrating the operation of an element in the counter bank of FIGURE 8;

FIGURE 12 is a timing diagram showing the sequence of operating the counter bank of FIGURE 8;

FIGURES 14A, 14B and 14C show various modifications of the counter bank in FIGURE 8;

FIGURE 15 is alternative structure of a magnetic thin film counter bank which can be used;

FIGURE 16 shows the arrangement of each element in the counter bank of FIGURE 15;

FIGURE 17 is a vector diagram illustrating the operation of an element in the counter bank of FIGURE 15, and FIGURE 18 shows a simple embodiment of the ZEROES counter.

Figure 1:
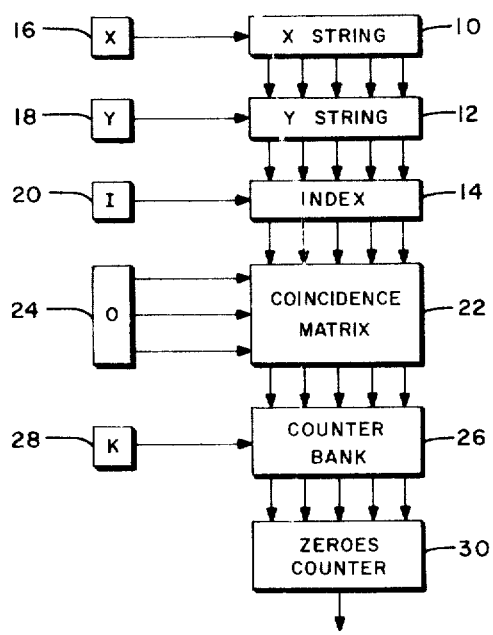
FIGURE 1 is a block functional diagram of the system.

FIGURE 1 is a block diagram of the character correlation system as it is broken down into its broad functional units. Here are shown at least two search memory fields 10 and 12 each capable of holding an individual sequence or string of characters in a plurality of storage locations. The character strings are conveniently identified in the present discussion as the X string held by memory field 10, and the Y string held by memory field 12. A third search memory field 14 is also provided for holding index characters I at a plurality of storage locations therein in order to permit the system to analyze a larger number of character relationships. The index field 14 preferably can be made large enough to hold the same type of character as contained in the X and Y fields so that it may be used for storing a third character string when not needed for indexing.

For maximum versatility, each string field 10 and 12 and each digit of the index field 14 may be interrogated independently or in combination with the others. Interrogation circuitry for field 10 is represented by block 16 labelled X to indicate that each of the X string character locations may be interrogated for the presence of a particular character applied by the comparison circuitry 16.

Likewise, block 18 labelled as Y represents comparison circuitry for field 12 which can search the Y string sequence for the presence of some particular character. Block 20 labelled I is the control circuitry for the index field 14 or, alternatively, may be used as the comparison circuitry for scanning a Z string of characters therein whenever indexing is not required.

A coincidence matrix 22 receives outputs from the search memory fields and in turn is controlled by comparison signals from a circuit 24 labelled O. The coincidence matrix broadly has the function of accepting information representing the spatial locations of character fields in the search memory fields and then permitting comparisons thereof in several different shifted positions with reference to information supplied by circuit 24. The results of these comparisons in the coincidence matrix are then directed to a counter bank 26 which is comprised of a plurality of counting registers one for each of the character locations of the search memory field. Each register of the counter bank may be preset to some initial predetermined count by a circuit 28 labelled K. At the conclusion of the analyzing operation, the number of counting registers in the bank 26 which contain a count of some final predetermined value are totalized by a so-called ZEROES counter 30 in order to conveniently represent the result. Turning now to a detailed description of the preferred embodiment, FIGURE 2 illustrates a search memory comprised of an array of magnetic thin film binary storage elements. The X string search memory field 10 is comprised of a plurality of thin film elements 32 arranged in a number J of columns, for example ten, each column adapted to hold a multibit coded character of the X string. The search memory field 12 is comprised of thin film elements 34 also arranged in an identical number J of columns, one for each multibit coded character of the Y string. Likewise, the index field 14 is comprised of thin film elements 36 arranged in ten columns one for each of the character locations in fields 10 and 12. A character in field 14 may be represented in either a single or a multibit code according to the function of the field during a particular problem.

Before continuing with the organization of FIGURE 2, reference should now be made to FIGURES 3, 4A, and 4B, which illustrate and describe the operation of one type of thin film element which may be successfully utilized in a search memory configuration. As seen in FIGURE 3, each binary storage element of the search memory is comprised of a pair of magnetic thin film cores 38 and 40 each of the type described in the United States patent to Rubens, No. 2,900,282. This kind of magnetic core, which normally is deposited upon a substrate (not shown) is preferably of the uniaxial type, i.e., the remanent magnetization in the absence of external fields lies in either one of two opposite directions along an axis fixed with respect to the core and referred to hereafter as the preferred magnetic axis or PMA. Such films are characterized by an anisotropy field $H_K$, typically a few oersteds in value. The direction of the PMA in core 38 is illustrated by the double ended arrow, while that of core 40 is likewise illustrated by a double ended arrow. FIGURE 3 is an exploded view of the binary core sandwich in which film 40 lies in a plane parallel to the plane of film 38 and directly therebeneath. However, core 40 is oriented with respect to core 38 such that the PMA of the former is transverse, preferably at 90°, to the PMA of the latter. Both cores are electrically insulated one from the other, but in such a manner as to permit inductive coupling therebetween.

The thin film 38 is considered to be the memory core of the sandwich which holds one bit of some single or multibit character. During application of one or more large external writing magnetic fields to core 38, the magnetization of the film generally lies in the direction of said applied field. Upon termination of the external fields, any remanent magnetization in the film will revert to one of two opposite directions along the preferred magnetic axis rather than remaining in the direction of the last applied field. The particular direction of the remanent magnetization along the PMA depends upon several conditions, one of which is the smallest angle that the magnetization need turn through after termination of the external field. A binary 1 is considered to be stored in core 38 by causing its remanent magnetization to lie along the preferred magnetic axis in a direction indicated by arrow head 42, while a binary 0 is considered to be stored in the core by causing the remanent magnetization to lie in a direction indicated by arrow head 44. Any remanent magnetization existing in memory core 38 produces a magnetic field external thereto which influences the degree and direction of the magnetization in core 40, which in turn is identified as a read out core used in non-destructively interrogating the contents of core 38. Because the external field from core 38 is anti-parallel to the remanent magnetization in said core, it is noted that the external field is transverse to the preferred axis of magnetization in core 40. The strength of this magnetic field from core 38 is sufficiently great to create lines of flux in read out core 40 which substantially lie in the same direction as that of the core 38 external field. Therefore, it will be appreciated that the magnetization in core 40, due to the biasing field of the core 38 remanent magnetization, is in a direction transverse to the direction of the PMA in core 40. However, although core 38 is inductively coupled to core 40, the field set up by any flux in core 40 should not substantially affect the direction of magnetization in core 38. This criterion may be effected by providing core 38 with a relatively high coercivity while core 40 has relatively low coercivity. If the effect of the external field generated by the remanent magnetization in core 38 is cancelled as regards core 40, then the remanent magnetization remaining in core 40 will lie parallel to its PMA in either of the two opposite directions represented by arrow head 46 or arrow head 48. Any change in the direction of magnetization in core 40 can therefore be sensed in order to determine the nature of the binary content of core 38.

The manner in which nondestructive read out occurs is as follows. A steer line or winding 50 is electrically insulated from cores 38 and 40 but is inductively coupled to at least core 40. Any current flowing through winding 50 sets up an external magnetic field having a direction at a right angle thereto. If winding 50 is oriented so that it lies at a right angle to the PMA of core 40, then any external field generated by current flowing therethrough will be approximately parallel with said PMA. This field, which may be called a longitudinal steering field, need have a magnitude sufficient only to cause the remanent magnetization in core 40 to always revert to the same direction upon cancellation of any external field on core 40 which is transverse to its PMA. Thus, the longitudinal steering field, as generated by current flowing in conductor 50, determines a definite and unchangeable direction to which the remanent magnetization in core 40 always returns in the absence of any strong transverse external field applied thereto. Cancellation of the effect of the external field applied by remanent magnetization in core 38 is accomplished by means of an interrogate winding 52 which may have current flow in either of the two directions therethrough, and which is inductively coupled to at least core 40. Any external field generated by current in winding 52 will be at a right angle to this axis. If conductor 52 is oriented transverse to the PMA of core 38, then it will be seen that the external field generated by winding 52 either reinforces or reduces the effect in core 40 of the external biasing field produced by the core 38 remanent magnetization. Winding 52 is electrically insulated from the two cores and from all other windings. In order to sense a change in the direction of magnetization in core 40, a sense winding 54 is provided which is inductively coupled therewith and is so oriented transverse to the core 40 PMA, preferably at 90 degrees, that any change of magnetization along said PMA results in an E.M.F. signal being induced in sense winding 54. On the other hand, any change in the magnetization of core 40 in a direction parallel to winding 54 will not generate an output signal therein, since flux in this direction does not link the conductor.

In order to fully understand the operation of the binary element of FIGURE 3, reference is now made to FIGURES 4A and 4B. In each of these figures there are shown two vector diagrams, the upper one indicating the approximate magnitude and direction of the magnetic fields involved during the operation, and the lower one indicating the approximate magnitude and direction of the magnetization in core 40 in the presence of the above-mentioned magnetic fields. For the purpose of this description, it is assumed that the axes of windings 50 and 54 are both substantially parallel with the PMA of core 38, while the axis of winding 52 is substantially parallel with the PMA of core 40. In FIGURE 4A, the external field produced by core 38 remanent magnetization representing binary 1 is indicated by $H_M(1)$ in the upper diagram, while the external field representing binary 0 is indicated by $H_M(0)$. Obviously only one of these two vectors may exist in the core at any one time. The core 38 and core 40 parameters are so chosen that the fields $H_M(1)$ and $H_M(0)$ are about 1.5 times the $H_R$ of core 40. A small steering current is normally caused to flow continuously through winding 50 in a direction 56 so that an external field labelled $H_S$ is generated which lies at a 90 degree angle with respect to the external fields $H_M(1)$ or $H_M(0)$. Since conductor 50 lies at a right angle with the preferred magnetic axis of core 40, field $H_S$ must also lie parallel to the PMA of the read out core 40. The magntiude of field $H_S$ may be quite small inasmuch as its only function is to insure that the remanent magnetization in core 40 will fall in the direction of $H_S$ along its PMA when the effect of a transverse external field $H_M(1)$ or $H_M(0)$ is cancelled.

Now turning to the lower vector diagram of FIGURE 4A, it is seen that the direction of flux in core 40 is primarily determined by the direction of the applied external fields $H_M(1)$ or $H_M(0)$. For example, when field $H_M(1)$ is applied, then magnetization $B(1)$ is produced in core 40 in a direction parallel to said field. If field $H_S$ is also present in core 40 at this time, then $B(1)$ would actually be in a direction determined by the resultant of the two fields $H_M(1)$ and $H_S$. However, inasmuch as the magnitude of the field $H_M(1)$ is relatively large with respect to the magntude of field $H_S$, it may be considered that the direction of flux $B(1)$ is substantially parallel to that of the former. In like fashion, the presence of field $H_M(0)$ causes the creation of flux in core 40 having a direction substantially as indicated by $B(0)$ in FIGURE 4B. It will therefore be appreciated that in the preferred configuration of the search memory, the angle between the flux $B(0)$ or $B(1)$ and the PMA of film 40 is approximately 90 degrees. The flux therefore lies substantially parallel to the so-called "hard" axis of magnetization in core 40 which is that axis perpendicular to the PMA.

Turning now to FIGURE 4B, the mode of operation will be explained for interrogating the content of core 38. As before described, each bicore in the search memory field is interrogated as to the presence or absence of a particular bit 1 or 0, according to the particular word for which a search is conductor. In FIGURE 3, this is performed by producing a current flow in the interrogate winding 52 in either one direction or the other according to the value of the requested bit. For example, if it is desired to ascertain whether or not the bicore of FIGURE 3 contains a binary 1 in its memory core 38, then current flow in the direction of arrow 58 is produced in winding 52 such that it generates an external magnetic field $H_I(1)$ as shown in the upper vector diagram of FIGURE 4B. Assuming now that the remanent magnetization in core 38 lies in direction 42 which produces field $H_M(1)$, it is seen from FIGURE 4B that interrogating field $H_I(1)$ has a direction in core 40 such that the total transverse field therein is the sum of $H_M(1)$ and $H_I(1)$. The absolute value of $H_I(1)$ is adjusted to be equal to that of $H_M(1)$, so that the total transverse field is twice that of $H_M(1)$. Therefore, the direction of magnetization in core 40 is maintained in the direction of the flux $B(1)$ in the lower diagram of FIGURE 4B. If the field $H_M(1)$ by itself has sufficient magnitude to drive core 40 to saturation, the application of a field having twice this magnitude will not increase the magnitude or direction of flux $B(1)$. Because there is no substantial change of flux magnitude in a direction parallel to the core 40 PMA under this first assumed condition, there will be no change in flux linking the sense line 54. Therefore, no E.M.F. signal is induced in winding 54 which thereby indicates that the core 38 contains a binary 1.

In the event that field $H_M(0)$ exists at the time that field $H_I(1)$ is applied, thus indicating that core 38 contains a binary 0, it is seen from FIGURE 4B that the vector addition of $H_I(1)$ and $H_M(0)$ results in the cancellation of any transverse field effect in core 40. As noted previously, the magnetic core 40 used in this particular search memory has the property such that its remanent magnetization is stable only in either one of two opposite directions along the PMA. The cancellation of the dominant field $H_M$ in core 40 thereby causes magnetization $B(0)$ to rotate and fall in one of two opposite directions along its PMA. The particular direction adopted by the remanent magnetization is governed by the direction of the small steering field $H_S$. Thus, as seen in the lower vector diagram of FIGURE 4B, the remanent magnetization $B(R)$ in core 40 will fall along its PMA in a direction indicated by the steering field $H_S$ in the upper diagram of FIGURE 4B. The presence of the steering field $H_S$ during the time when any transverse field is cancelled therefore prevents the core 40 magnetization from ever rotating to a direction along its preferred axis opposite to that of $B(R)$ shown in FIGURE 4B. Thus the change in flux $B(0)$ will always be in the same direction.

As before noted, the sense winding 54 is so oriented that a voltage is induced therein by any change of the flux in core 40 in a direction parallel to the PMA, said direction being perpendicular to the axis of winding 54. Under the assumption that core 38 contains a binary 0 and is being interrogated for a binary 1, then a first signal of one polarity is induced in sense line 54 as the direction of magnetization changes from that of $B(0)$ to $B(R)$, which thus indicates that core 38 does not contain the binary bit for which it is searched. Upon discontinuing the interrogation field $H_I(1)$, the effect of the remanent magnetization field $H_M(0)$ will again be felt in core 40 such that the direction of magnetization therein will revert to that indicated by the vector $B(0)$. A second output signal of polarity opposite to that of the first signal now appears on winding 54. Either of these two signals may be used as the indication of noncomparison. In the event that memory core 38 contains a binary 0, then the application of interrogation field $H_I(0)$ in FIGURE 4B will result in a reinforcement of the transverse field $H_M(0)$ in core 40 such that the direction of magnetization in core 40 will not be changed. In this event, the flux maintains the direction as indicated by $B(0)$ in FIGURE 4B. However, assuming that core 38 contains a binary 1 when the cell is interrogated for a binary 0, the application of the fields $H_M(1)$ and $H_I(0)$ in FIGURE 4B results in cancellation of a transverse field such that only remanent magnetization $B(R)$ remains in core 40. Vector $B(R)$ has a direction along the preferred magnetic axis as steered by the longitudinal field $H_S$. In this event, the direction of magnetization in core 40 will have changed from that indicated by B(1) to the direction indicated by B(R). Because of the change in flux linking conductor 54, a first signal is induced therein at the commencement of the interrogating field $H_I(0)$. This signal has the same polarity as that signal induced when the change in flux direction is from B(0) to B(R). Upon discontinuing the interrogating field $H_I(0)$, the direction of flux in core 40 reverts to the direction indicated by B(1), and a second EMF of opposite polarity will be induced in conductor 54.

The fields $H_I$ and $H_S$ are of insufficient magnitude during the read out cycle to affect the direction of remanent magnetization in core 38 because of its much higher coercivity. Only flux in the lower coercivity core 40 can be changed by these applied reading fields in the manner described above. However, by increasing the current through winding 52 during a write cycle, a larger field $H_I(1)$ or $H_I(0)$ can be used to switch the flux in core 38 to either direction along its PMA so as to store either a 1 or a 0 in the bicore. Usually, the magnitude of this writing $H_I$ field is just larger enough so that there is still required the concurrent application of a small field $H_S$ (transverse to the PMA of core 38) in order that flux reversal can take place in the memory core. Instead of using the read drive windings 50 and 52 for writing, however, additional write windings may be provided for each bicore to generate the larger longitudinal and transverse fields required to switch the flux in memory core 38. Another modification of the search memory element might be one wherein the memory core 38 is dispensed with in favor of an additional winding individual to its read out core 40 and through which current flows to set up either the $H_M(1)$ or $H_M(0)$ fields. However, the advantage of using a memory core 38 to generate these fields is that a bit can be permanently stored in the element without a continuous expenditure of power as would otherwise be the case for said additional winding.

Returning now to FIGURE 2, each thin film binary storage element 32 of field 10, element 34 of field 12, and element 36 of field 14 may be comprised of the bicore sandwich illustrated in FIGURE 3. Within each search memory field 10 and 12 the number of elements within each column is determined by the particular code used to represent the characters stored within the memory. In the embodiment of FIGURE 2, it is assumed that a straight binary code of five bits is used to represent each character. This then requires five element rows in each of the fields 10 and 12. If the I field 14 is to also have the capability of storing the same character, then it too must have five element rows. A five bit binary code is of a size to permit the representation of 32 unique characters and so is sufficient to handle the 26 letters of the English alphabet plus several special characters. However, by expanding the binary code to six bits, sixty-four unique characters may be identified among which could be digits 0–10 and further additional characters. Other codes may also be employed such as "two out of five," a straight decimal code, or many others. Although only two elements per column are actually shown for the Y field 12 and the I field 14 in order to simplify the drawings, it is understood that each also contains five thin film binary elements per column in the manner shown by field 10.

For each of the thin film elements in fields 10, 12, and 14, the horizontal line passing thereacross represents the read out core interrogate drive winding 52 shown in FIGURE 3, while the vertical line passing thereacross represents the sense output winding 54 of the element. The steering field winding 56 of FIGURE 3 is not shown in FIGURE 2 but is assumed to be present in order to apply the steering field $H_S$. For each field the interrogate windings of all elements in the same row are connected in series such that each is interrogated for the same binary value. Thus, each of a group of five row interrogate windings 62–66, inclusive, is common to one of the rows 1–5, respectively, of field 10. In field 12, each of the interrogate windings 67–71, inclusive, is respectively individual to and common with the elements in respective rows 1–5, while each of the interrogate windings 72–76, inclusive, are likewise individual to and common with the elements in respective rows 1–5 of field 14.

The vertical sense windings of all elements in the same column of a field are likewise connected in series circuit with one another, as well as in series circuit with the sense windings of the corresponding spatially located columns in each of the other fields. Thus, a sense winding 77 is in common with all of the elements 32 in column 1 of field 10, as well as being in common with all of the elements 34 in column 1 of field 12 and all of the elements 36 in column 1 of field 14. Sense winding 78 is common with all of the elements in column 2 of fields 10, 12, and 14. A similar arrangement exists between the remaining sense windings 79–86 and the elements in respective columns 3–10 of all search memory fields.

FIG. 2 illustrates a switch arrangement, manually or automatically actuable, connected with the interrogate windings 62–76 in order to direct current in either direction therethrough in the manner described in connection with FIGURE 3. Each one of a group of single pole-three position switches 90 through 94, inclusive, may be moved to a positive potential terminal, a negative potential terminal, or a neutral center position so as to respectively cause current flow to the right towards the ground, to the left away from ground, or no current flow whatsoever, in each of respective interrogate windings 62–66. Current flow does not actually begin, however, until the ganged contacts 95–99 are simultaneously closed by moving linkage 100. In similar fashion, the group of single pole-three position switches 102–106 is used to selectively energize the interrogate respective windings 67–71 of field 12, while switches 107–111 selectively energize respective interrogate windings 72 through 76. As in field 10, the actual current flow in the interrogate windings of fields 12 and 14 cannot actually commence until ganged contacts 112–116 and 117–121 are closed by moving linkage 100. When a search memory field is to be interrogated, the magnitude of the positive or negative potential applied to its row interrogate windings should be large enough to cause read out from the cores 40 without causing a change in the remanent magnetization of cores 38 as has been previously explained. To write a character into a particular search field column, the row windings and the steer windings can also be conveniently employed in the following manner. Each column may have the steer windings of its elements connected in series circuit so as to form a group of column steer windings much in the manner of column sense windings 77–86. Each column steer winding may be individually actuable so as to select only one column for entry of a character therein. Each of the switches 90–94, 102–106, and 107–111 is set to either its positive or negative terminal so as to determine the bit values of the character to be written into the respective fields 10, 12, and 14, while the magnitude of the current through the row interrogate windings is increased, as by increasing the supply potential, to produce longitudinal fields $H_I$ sufficient in the presence of a transverse field $H_S$ to thereby switch the magnetization in the memory cores. By now selectively energizing only one of said column steer windings, a character can then be entered into the memory cores 38 of only that memory column having the transverse field $H_S$ applied thereto. After characters have been written into this selected column, switches 90–94, 102–106, and 107–111 are then reset to represent characters to be written into another column and the steer winding of said another column is then energized. Thus, the sequential energization of the column steer windings one for each setting of the row winding switches causes characters to be entered into each search memory field column by column.

To briefly describe the interrogation of the search memory, first assume that the X string of characters stored in field 10 includes the English letter A only in columns 1 and 4, with the remaining columns of field 10 storing either a different letter or no letter at all. If letter A is further assumed to be represented by a five bit code as 00001, then the memory cores of the row 1 elements in columns 1 and 4 will have a remanent magnetization representing binary 1, while the memory cores of the rows 2–5 elements in columns 1 and 4 will have remanent magnetization in a direction specifying binary 0. A different pattern of bits will be held in each of the other columns 2, 3, and 5–10 according to the particular different letter held therein. Further assume that fields 12 and 14 are not to be interrogated so that the characters held by the memory cores of the elements therein are presently of no interest. If field 10 is now to be interrogated in order to determine in which columns the letter A might be stored, switch 90 is moved to contact its positive terminal while switches 91 through 94 are each moved to contact their negative terminal. Linkage 100 is now actuated to close contacts 95–99 so as to generate current in winding 62 towards the ground, while current is generated in windings 63–66 in the opposite direction away from ground. In each of the columns 1 and 4, the row 1 element with binary 1 in its memory core will not have a change in direction of flux in its read out core due to the fact that there is no cancellation of transverse fields therein. Consequently, there is no output EMF induced in those segments of sense windings 77 and 80 which are inductively coupled with the row 1 cores. In like fashion, since each of the read out cores of the row 2–5 elements in columns 1 and 4 does not have a cancellation of transverse fields therein, no voltage is induced in sense windings 77 and 80 from any of these row elements. However, there is at least one read out core in each of the remaining columns 2, 3, and 5–10 in which there is a cancellation of the transverse field due to a non-comparison between its memory core remanent magnetization and the bit being interrogated for. This cancellation of transverse fields in at least one element of each of the columns 2, 3, and 5–10 therefore induces voltage on each of the respective sense windings 78, 79, and 81–86 so as to indicate the absence of the letter A in any of these columns. It will thus be appreciated that there appears on each of the sense windings 77–86 a signal indication of whether the particular character interrogated for is stored in its respectively coupled character column. In the particular search memory shown here, said signal takes the form of an induced EMF whenever the character is absent from the respective column, and takes the form of an absence of induced EMF when the character is stored in the particular column.

As stated above, an assumption is made that only field 10 is interrogated when linkage 100 is actuated. For this case switches 102–106 and 107–111 are maintained in their neutral position so as to avoid the generation of current flow in their respective interrogate windings when contacts 112–121 are closed. If it is alternatively desired to interrogate only field 12 of the search memory, then switches 90–94 are placed in their neutral center position and switches 102–106 are set to contact either their positive or negative terminals according to the character for which interrogation is desired. A different kind of search is one made for the presence of the letter A contained in the corresponding spatially located columns of the fields 10 and 12, or alternatively, a search made in field 10 for the letter A coupled with a search in field 12 for the letter C in corresponding columns. For the first case, both groups of switches 90–94 and 102–106 are set to the binary code for letter A. Linkage 100 is then operated to simultaneously close contacts 95–99 and 112–116 (contacts 117–121 are also closed but it is assumed here that switches 107–111 are left in their center position). For this condition it will be obvious that a voltage will be absent from any one of the sense windings 77–86 only when the letter A is contained in corresponding columns of the fields 10 and 12. For example, assume that letter A is stored only in columns 1 and 4 of field 10, and only in column 1 of field 12. Sense winding 77 therefore has no voltage induced thereon from either of the column 1 elements 32 or 34, so as to indicate the presence of the interrogated character in column 1 of both fields. On the other hand, at least one of the read out cores of the column 4 elements 34 in field 12 will have a change in its magnetization so as to induce a voltage on sense winding 80, thus indicating that letter A is not stored in column 4 of both fields. The remaining sense windings 78, 79, and 81–86 obviously also have voltage induced thereon because of characters other than A held in the respective field columns.

The second case mentioned above, that of interrogating field 10 for letter A and interrogating field 12 for letter C, is now described. Here assume that letter A is once again held in columns 1 and 4 of field 10 and letter C is held in columns 1 and 15 of field 12. Switches 90 through 94 are set to the binary code for letter A, while switches 102–106 are set to the binary code for the letter C here assumed to be 00011. The like comparison of each of the bits held in the columns 1 and 4 memory cores of field 10 therefore prevents signals being induced on sense windings 77 and 80 from their respective read out cores. In field 12, the like comparison of the bits held in the memory cores of column 1 likewise prevents a signal from being induced in sense winding 77 from the read out cores associated therewith. Consequently, sense winding 77 remains free from any induced EMF at the time that linkage 100 is actuated. On the other hand, since column 4 of field 12 contains a letter other than C at least one read out core of the elements 34 in said column will have its flux changed to thereby cause a voltage to be induced on sense winding 80. This signal on winding 80 is therefore indicative of the fact that a column 4 of at least one of the interrogated fields does not contain the character whose code is set up on the respective field interrogating switches. EMF signals also will appear on the other sense windings 78, 79, and 81–86.

Field 14, as has been explained previously, may be used either for an index function or as an additional character string field. When used for indexing, the normal mode of operation for field 14 is to enter a particular bit configuration into the memory cores of elements 36 and then to interrogate only those rows in field 14 that contain the desired indexing bits at the time that one or more of the other fields is interrogated. When field 14 is used for storing an additional string of characters, however, then all of its memory cores are set to values representing the stored characters and switches 107–111 are thrown to a particular binary code representing a character for which interrogation is made. The dual function of field 14 will become clear during description of the entire system operation in subsequent paragraphs.

FIGURE 5 illustrates one embodiment of the coincidence matrix, which, in the preferred form, comprises an array of magnetic thin film elements 130 arranged in columns and rows. There are as many columns numbered 1–10 in the coincidence matrix as there are columns in each of the search memory fields 10, 12, and 14. The number K rows in the coincidence matrix is governed according to those functions to be analyzed by the system as will be clearly understood in subsequent paragraphs. There need not be, however, an equal number of elements in all columns of the coincidence matrix, because those missing in the first five columns of FIGURE 5 are not required for a successful operation of the system.

Reference is now made to FIGURES 6 and 7 before continuing with the description of FIGURE 5. FIGURE 6 is an exploded view showing the construction of each element 130 in the coincidence matrix. Only one thin film magnetic core 132, of the type explained in connection with FIGURE 3, need be employed having its PMA in the direction shown by the double ended arrow. Inductively coupled therewith is a sense winding 134 whose axis is parallel to the PMA of core 132 as the winding passes over the core. Also inductively coupled with core 132 but with their axes substantially at right angles to the PMA thereof are a drive winding 136 and an interrogate winding 138. All windings 134, 136, and 138 are electrically insulated one from the other and from core 132. Each of the windings 136 and 138 can carry a current in either direction therethrough as indicated by the arrows, while the sense winding 134 carries an output EMF signal from the element. FIGURE 7 is a vector diagram of the fields applied to magnetic film element 132. Current flow in winding 136 in the direction of arrow 140 generates an external field having the direction $H_D(1)$ within core 132, while current flow in winding 136 in the opposite direction of arrow 142 generates a field in core 132 in the direction of $H_D(0)$. The numbers in parentheses designate a binary value significance to be given to each field direction. Likewise, current flow in interrogation winding 138 in the direction of arrow 144 generates a field $H_I(1)$ within core 132, while current flow in the opposite direction of arrow 146 generates the external field $H_I(0)$. In addition to the $H_D$ and $H_I$ fields, which are applied to core 132 only when current flows within its respective windings, a small fixed transverse field $H_S$ is generated by either a magnet or an additional winding (not shown) such as steer winding 50 in FIGURE 3, or alternatively by the external field of a high-coercivity film core which is positioned with respect to core 132 in the same manner as core 38 is positioned with respect to core 40 in FIGURE 3. A construction of the last type comprises a bicore. The function of the small continuously applied field $H_S$ is to ensure the rotational switching of the magnetization within core 132 in the proper direction of rotation whenever either one of the windings 136 or 138 carries current in either direction. A rotation of the film magnetization induces in the sense windings 134 a signal indicative of such switching.

In operation of FIGURE 6, core 132 is first driven by a current pulse flowing only in the drive winding 136 to a magnetization state corresponding to a bit to be examined for coincidence with a reference bit. First assume that there is no current in either winding 136 or 138, and that the remanent magnetization in core 132 lies in a direction along its PMA indicated by vector B in FIGURE 7. The continuously applied small field $H_S$ has insufficient magnitude to substantially alter the magnetization in core 132 from a parallel position along the PMA. Next assume that current is passed through digit winding 136 in the direction of arrow 140 so as to generate the field $H_D(1)$. This field, coupled with the $H_S$ field, is sufficient to rotate the core 132 magnetization into the opposite direction as indicated by the vector $B(1)$ of FIGURE 7. During this rotation of the flux $B(0)$ to $B(1)$, there is a change of flux in core 132 in a direction transverse to sense winding 134 which induces a signal therein. However, this signal is ignored during this particular time of the operating cycle. After the flux in core 132 assumes the direction $B(1)$, current flow in winding 136 is terminated so as to terminate the field $H_D(1)$ without, however, altering the direction of flux $B(1)$ which thereafter remains in its new rotated direction. The interrogate winding 138 is now pulsed so that current flows therethrough in one direction or the other according to the value of a reference bit which is to be compared against the bit previously entered by the excitation of winding 136. Assume that said reference bit is a binary 1 such that current flow in winding 138 in the direction of arrow 144 generates the field $H_I(1)$. Since $H_I(1)$ is in the same direction as the flux magnetization $B(1)$, there is no rotational switching of flux core 132 at the time that the interrogate winding 138 is pulsed. Consequently, even though sense winding 134 may now be examined during the pulsing of 138, there appears no induced voltage thereon from core 132. This indicates that the value of the bit entered into core 132 by winding 136 is identical to the value of the reference bit applied via winding 138. On the other hand, now assume that the reference bit is a binary 0 such that current in winding 138 in the direction of arrow 146 generates the field $H_I(0)$. This field, together with the small steering field $H_S$, now causes the flux $B(1)$ in core 132 to be rotated 180° back to the direction indicated by vector $B(0)$. This rotation induces an EMF in sense winding 134 which indicates the lack of identity between the reference bit and the previously inserted bit.

Returning now to FIGURE 5, the organization of the coincidence matrix array is seen to be the following. For each row of the matrix, all elements therein have their interrogate windings 138 connected in series so as to form a set of five row interrogate windings 150–154, inclusive. For each column of the coincidence matrix, all elements 130 therein have their drive windings 136 connected in series so as to form a set of ten column drive windings 155–164, inclusive. The sense winding 134 of each element 130 at a particular column and row intersection is connected in series with the sense winding of the element in the next higher numbered adjacent column and adjacent row intersection so as to form a diagonal complex of sense windings through the array. For example, the sense windings of the following elements, each identified by its column and row position, are connected in series so as to form an output sense winding 165 from the matrix: column 1, row 1; column 2, row 2; column 3, row 3; column 4, row 4; and column 5, row 5. Nine other matrix output sense windings 166–174 are likewise formed by connecting appropriate sense windings of certain elements in common one with the other according to the relationship given above.

Each of the column drive windings 155–164 to the coincidence matrix is respectively connected to the output sense windings 77–86 of the search memory via respective drivers 500–509. Consequently, a signal induced on any one of the sense windings 77–86 is sufficient to drive each element 130 which is in the corresponding connected coincidence matrix column. For the purpose of this discussion, it is assumed that the signal which is first generated whenever there is lacking a character find is of such polarity as to allow energizing of drivers 500–509 so as to place the coincidence memory elements 130 into their binary 1 state. Thus, if all coincidence matrix elements 130 are initially set to their binary 0 state prior to interrogation of the search memory, then only those elements 130 connected with search memory columns where character finds are made will remain in their binary 0 state after the search memory has been interrogated.

In order to apply reference bits to the selected rows of the coincidence matrix, a group of single pole-three position switches 180–184 are provided together with a set of ganged contacts 185–189 actuated by a linkage 190. Each switch in the group 180–184 can be moved to contact either a positive or a negative terminal respectively representing a reference bit value of binary 1 or binary 0. Alternatively, each switch can be left in a center neutral position so as to prevent current flow in its respective row interrogate winding even when contacts 185–189 are closed. Inserted between each of the switches 180–184 and its associated interrogate winding is a different one of the inverter circuits 192–196, respectively. The function of each inverter is to change the polarity applied to it from its respective switch so as to interrogate its row elements 130 for a bit opposite in value to that indicated by the switch setting. For example, if switch 180 is thrown to contact its positive terminal which represents a binary 1, inverter 192 applies a negative voltage to interrogate winding 150 so that each element 130 in row 1 is actually interrogated for a binary 0. Conversely, by setting switch 180 to the binary 0 (negative) terminal, inverter 192 applies a positive voltage to winding 150 so as to interrogate its row elements for a binary 1. The purpose of providing inverters 192–196 is to compensate for the fact that the sense output windings 77–86 of the search memory have null (no) outputs thereon when character coincidences is found. Inverters could alternatively be inserted into each of the search memory sense output windings 77–86 rather than in the interrogate windings 150–154 of the coincidence matrix, but in most systems the number of character columns will be considerably in excess the number of rows contained in the coincidence matrix. Therefore, the inverter location shown in the preferred embodiment is by far the more economical of the two arrangements.

The general function of the coincidence matrix is to permit the simultaneous comparison of selected reference bits, as supplied by switches 180–184, with several shifted positions of the bits supplied on input drive windings 155–164. In other words, there can be simultaneously determined the existence of coincidences between selected reference bits and a group of incoming bits when shifted through several possible positions. Those shifted positions of the incoming bits which yield an exact coincidence are identified by the absence of an induced EMF on appropriate sense windings 165–174. As an example, assume that a search memory interrogation applies current pulses to input drive windings 155, 156, 159, 161, 163, and 164 which are respectively associated with elements in columns 1, 2, 5, 7, 9, and 10 of the coincidence matrix. Each of these current pulses is sufficient to set all of its associated column elements 130 to a binary 1 value, whereas those elements in a column whose input drive line has no current therethrough remain in a binary 0 state (assuming that all matrix elements 130 have been previously set to binary 0 by appropriate use of switches 180–184 at a time prior to said search memory interrogation). Consequently, the binary condition of each element 130 in the coincidence matrix is represented by the values shown in Table 1 below.

TABLE 1

| Ref. Bits | Column | | | | | | | | | | Row |
|---|---|---|---|---|---|---|---|---|---|---|---|
| | 1 | 2 | 3 | 4 | 5 | 6 | 7 | 8 | 9 | 10 | |
| 0–1 | 1 | 1 | 0 | 0 | 1 | 0 | 1 | 0 | 1 | 1 | 1 |
| 0–1 | | 1 | 0 | 0 | 1 | 0 | 1 | 0 | 1 | 1 | 2 |
| 1–0 | | | 0 | 0 | 1 | 0 | 1 | 1 | 0 | 1 | 3 |
| 1–0 | | | | 0 | 1 | 0 | 1 | 0 | 1 | 1 | 4 |
| 0–1 | | | | | 1 | 0 | 1 | 0 | 1 | 1 | 5 |

Next assume that switches 180, 181, and 184 are moved to their negative terminals, while switches 182 and 183 are moved to their positive terminals. This applies reference bits of the values shown at the far left of Table 1, with inverters 192 to 196 changing these values to those shown to the immediate right thereof. Consequently, rows 1, 2, and 5 of the matrix are actually interrogated for binary 1 values, while rows 3 and 4 of the matrix are interrogated for binary 0 values. From Table 1 it will therefore be obvious that when the coincidence matrix is interrogated, none of the elements 130 coupled with output sense winding 165 will be switched due to the fact that each contains a bit value identical with the refernce bit value for which it is interrogated. For example, each of the elements 130 identified by column 1-row 1, column 2-row 2, and column 5-row 5 stores a binary 1 and in turn each is interrogated for a binary 1. Each matrix element identified by column 3-row 3, and column 4-row 4 stores a binary 0 and in turn is interrogated for binary 0. In effect, an examination of these five matrix elements indicates that the comparison being performed here is equivalent to comparing the inverted reference bits 11001 (rows 1–5) with the five left most bits 11001 of the bit sequence contained in row 1 of the matrix. It must further be recognized that row 1 of the coincidence matrix contains the original incoming bits in an unshifted position, i.e., shifted neither to the right nor to the left from the spatial (or column) positions in which they were generated from the search memory.

The absence of a signal on output sense winding 165 therefore indicates the complete identity between the reference bits and the leftmost five bits of the incoming signals from the search memory. Now refer to matrix output sense winding 166 which is inductively coupled in common with matrix elements 130 holding the bit values 10010, reading from row 1 to row 5. It will be immediately obvious that the bit configuration held by these matrix elements is identical to the bit configuration 10010 held in columns 2–6 of matrix 1. Thus, the comparison between the five reference bits 11001 and the bits in the elements along sense line 166 is the same as if a comparison were made between the reference bits and the incoming search memory signals shifted one position to the left with regard to their original positions as entered from the search memory. Because several of the matrix elements along output sense line 166 do not store bits identical with their respective interrogating reference bits, there will be a reversal of flux therein such as to induce an output voltage or sense line 166 to thus indicate there is no exact comparison between all of the refernce bits and the once shifted position of the incoming bits. It will further be noted that each of the remaining output matrix sense lines 167 to 174 has voltage induced thereon due to the fact that one or more elements common therewith contains a bit value oposite to that interrogated for. If one or more of the switches 180–184 is left in its center neutral position, then the associated interrogate winding is not pulsed and the information stored in the matrix elements of the associated row will have no bearing upon the nature of the output signals from the matrix.

Although the null output on any one of the sense windings 165–174 indicates that coincidence has been found between the reference bits applied and bits stored in the elements associated with that sense line, it is convenient to provide additional circuitry responsive to said null condition in order to generate a positive (or negative) signal indicative of said coincidence. This function may be performed by providing a group of bistable flip-flop elements 441 through 450 each operating to effectively change the voltage condition appearing on a respective one of the sense lines 165–174. Each flip-flop element has two stable states termed the 1 condition and the 0 condition, with inputs adapted to receive individual signals for placing a flip-flop in either one of said two conditions. When in the 1 condition, an output taken from the 1 terminal of flip-flop may be assumed to apply a positive voltage to some subsequent elements, whereas the same terminal provides a low or negative signal if the flip-flop is in its 0 condition. The sense lines 165–174 are individually conected to the 0 condition input of a respective flip-flop, and the 1 condition inputs of all flip-flops are connected with a switch 452 which, when closed, simultaneously sets all flip-flops to their 1 condition. A group of AND gates 454–463, inclusive are provided to sample the condition of respective flip-flops upon the application of a gate signal to each by a switch 466. In operation, switch 452 is closed to initially set all of the flip-flops 441–450 to their 1 condition prior to the operation of contacts 185–189. When this latter sets of contacts is then closed, voltages induced on certain of the output sense windings 165–174 are employed to reset their respective flip-flops back to the 0 condition, leaving only those flip-flops remaining in a 1 condition which are connected to the sense lines having a null output thereon. Contacts 466 may then be closed to sample the conditions of the flip-flops, with only those AND gates generating output signals which are associated with the coincidence matrix sense windings having null indications. The output signals from AND gates 454–463 appear on respective ones of lines 530–539 and may then be employed to select certain counters in the counter blank.

Certain operating modes of the character correlation system may require that the null outputs on one or more of sense windings 171–174 be ignored by the counter bank. Switches 520–523 are therefore provided in FIGURE 5 to selectively disconnect respective flip-flops 447–450 from their respective sampling AND gates 460–463, so that a binary 1 condition will not enable the generation of an output signal from the associated AND gate. Another way of handling this problem is by extending the coincidence matrix to the right as shown in FIGURE 5A so as to complete a parallelogram. Additional columns 11–14 are added each with a sufficient number of elements 130 to allow each of the sense windings 171–174 to have five elements inductively coupled therewith. Row interrogate windings 150–154 are extended to include these additional elements, and column 11–14 drive windings 550–553 are added each connected with a respective driver 554–557. By selectively closing one or more of the switches 558–561, the elements 130 in the associated columns may be set to their binary 1 condition. Thus, if any of the matrix rows is interrogated for an actual binary 0, a sense winding of the group 171–174 may have an EMF induced thereon if any of its elements 130 is set to binary 1. This means that each of the flip-flops 447–450 can be reset to binary 0 so that signals are prevented from respective AND gates 460–463.

Figure 9:
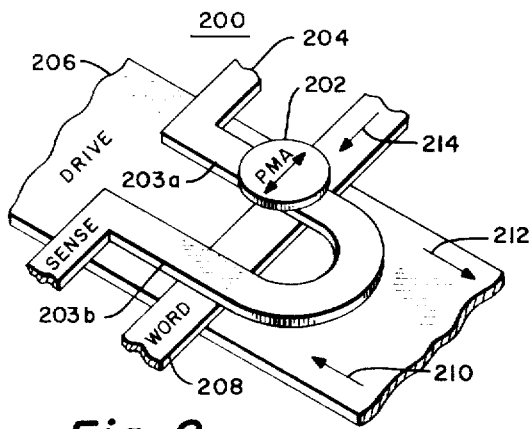
FIGURE 9 shows the arrangement of each element in the counter bank of FIGURE 8.

Referring now to FIGURE 8, one embodiment of a novel counter bank acceptable for use in the present system will now be described. A plurality of magnetic thin film elements 200 are arranged in a number of columns and rows, with the number of columns being equal to the number of columns in each of the search memory fields. The number of rows depends upon the number length desired for each counter of the bank. In the embodiment of FIGURE 8 four elements 200 are shown in each column. The elements in rows 1, 2, and 3 are those holding three bits of a number to be incremented or decremented, while the element in row four is utilized merely to indicate when a full count is reached. Only two columns of elements 200 are shown in FIGURE 8, i.e., columns 1 and 10, but it is to be understood that columns 2–9 are also included in the counter bank. However, before continuing further with the description of FIG. 8, reference is now made to FIGURES 9 and 10 in order to understand the construction and operation of each of the elements 200. Each element 200 is generally comprised of a single magnetic thin film core 202 of the type previously described with its PMA in the direction indicated by the double ended arrow. One leg or branch 203a of a "hairpin" sense winding 204 is inductively coupled with core 202 so that its axis is transverse to the PMA, while the other leg 203b lies outside of core 202 so as not to be affected by any flux change therein. A drive winding 206 is also inductively coupled with core 202 such that its axis is transverse to the PMA, while a word drive winding 208 is inductively coupled with the core but parallel with said PMA. Both legs 203a and 203b of the sense winding 204 are seen to be inductively coupled with drive winding 206 so that each leg of the former has an EMF induced therein directly by current change in the latter because of mutual air coupling. These directly induced EMF's, however, oppose each other so that the net directly induced EMF in sense winding 204 is at all times equal to zero. This novel hairpin arrangement prevents false output signals, since as will be subsequently described, an output signal from winding 204 is only desired when there is proper change in flux in core 202.

Turning now to FIGURE 10, the direction of applied magnetic fields H and fluxes B will now be described. For the purpose of this discussion it is assumed that the remanent flux lying in the direction of B(1) along the PMA is indicative of a stored binary 1 in core 202, while flux in the direction of B(0) is indicative of a stored 0. Current flowing through drive winding 206 in the direction of arrow 210 is assumed to generate a field having a direction $H_D(1)$ which attempts to switch the core remanant magnetization therein to the B(1) direction. Current flowing in the opposite direction 212 through drive winding 206 produces the field $H_D(0)$ which attempts to switch the core remanent magnetization to the B(0) direction. However, the magnitude of the $H_D(1)$ field or the $H_D(0)$ field is not sufficient by itself to cause any substantial rotation of the flux in core 202. There must be also concurrently applied a field $H_W$ which is generated by current in the word winding 208 in either direction such as indicated by arrow 214. The field $H_W$ is transverse to the PMA of core 202. The relative amplitudes of the drive line fields $H_D$ and of the word line field $H_W$ are shown on the switching and creep threshold diagram of FIGURE 11. $H_D$ and $H_W$ each individually is below the creep threshold but their vector sum $H_D + H_W$ is above the switching threshold. Hence, the film 202 switches (i.e., flux B rotates from one remanent state to the other) when both are concurrently applied. Experimental evidence indicates that a switching time of the order of 4 nanoseconds can be achieved in this mode.

Returning now to the counter bank of FIGURE 8, the word windings 208 of all elements 200 in the same column are connected in series one with the other so as to form a common word winding individual to each column. In FIGURE 8 only two of these common word windings 216 and 218 are shown for each of the two disclosed columns 1 and 10 of the counter bank. It is to be understood that each of the missing columns 2–9 also has a word winding common thereto which is formed by the series connection of the word windings of the elements therein. The sense windings 204 of the elements in each column also are connected in series to form a common sense winding individual to each column in the manner of 220 and 222 shown for columns 1 and 12 in FIGURE 8. It will be arbitrarily assumed that a common sense winding has induced thereon a positive pulse when any film inductively coupled therewith in a column switches from a binary 0 state to a binary 1 state, whereas a negative pulse is induced on the sense winding whenever any film in its column switches from a binary 1 to a binary 0 state. The drive windings of elements 200 in the same row are also connected in series so as to form a drive line for each of the rows of the counter bank array. These row drive windings are numbered 224–227 in FIGURE 8.

In order to selectively apply current to each of the word windings, an individual element such as a bistable flip-flop is employed. Two such flip-flops 230 and 232 are shown in FIGURE 8 each respectively individual to columns 1 and 10. Word winding 216 for column 1 is connected to the 1 output terminal of flip-flop 230 whereby current flows through winding 216 only when flip-flop 230 is set to its 1 state. This setting may be accomplished by either of two signals applied to a logical OR gate 234 which is in turn connected to the set (or 1) input terminal of the flip-flop. One such signal is identified as SET which is applied in common to all corresponding OR gates one for each column, whenever switch contact 238 is closed. The other input to OR gate 234 is derived from lead 530 whenever flip-flop 441 is in its 1 state at the time AND gate 454 is sampled. In similar fashion, OR gate 236 of column 10 derives an input signal from lead 539, while columns 2–9, respectively, have their flip-flops set by signals derived from respective output leads 531–538. Each flip-flop is further reset to a 0 condition by any one of three signals applied to a second OR gate such as 240 for column 1, 242 for column 10. OR gate 240 has one input derived from a switch 244 which, when closed generates a Clear signal applied in common to all of the corresponding OR gates of the counter bank columns. OR gate 240 also receives inputs from AND gates 246 and 248 for column 1. OR gate 242 receives inputs from AND gates 250 and 252 in column 10, while AND gate 246 is enabled only when the count is to be decremented in counter bank by the closing of switch contacts 254, while AND gate 248 is enabled only when the count is to be incremented by the closing of switch contacts 256. Each of the signals Increment and Decrement from respective switches 254 and 256 is applied in common to corresponding AND gates of the counter columns. Each AND gate in the column circuitry is also responsive only to a different polarity of a signal induced upon the output sense winding associated with that column. For example, in column 1 a transformer 260 has its primary connected with sense winding 220 via a driver 262. The secondary of transformer 260 is grounded at a center tap thereof, with one end being connected to AND gate 246 and the other end connected to AND gate 248. A positive EMF induced on sense winding 220 is assumed to apply a positive signal to AND gate 248 and a negative signal to AND gate 246, whereas a negative signal induced on sense winding 220 is assumed to apply a positive signal to AND gate 246 and a negative signal to AND gate 248. Consequently, if switch 254 is in its closed condition when any one of the elements 200 in column 1 is switched from its binary 1 to its binary 0 state, AND gate 246 produces an output signal which is applied to the 0 input terminal of flip-flop 230. On the other hand, if switch 256 is in its closed condition when any one of the elements 200 in column 1 is switched from its binary 0 to its binary 1 condition, then AND gate 248 generates an output signal which is also applied to the 0 input terminal of flip-flop 230. Each of the other counter bank columns has its corresponding pair of AND gates connected in similar fashion through a transformer with the column sense winding as evidenced by column 10 in FIGURE 8.

Each of the drive input windings 224–227 is respectively connected with a different one of a group of signal generators 270–273. Each of these generators may be comprised of well known circuitry which, when actuated, produces a single pair of time spaced pulses of opposite polarity such as shown in FIGURE 12. For example, generator 270 upon application of a signal to its input 274 is assumed to first generate a pulse 276 of negative going polarity followed a short time later by a pulse 278 of positive going polarity. On the other hand, if an input signal is applied to its input terminal 280, then the first output pulse 282 therefrom is of positive going polarity shortly followed by a pulse 284 of negative going polarity. Generator 270 in actual construction may therefore consist of a first astable trigger circuit responsive to input 274, and a second astable trigger circuit responsive to input 280. However, other constructions of the generator are considered to be well within the scope of this invention so long as the required generator functions are present. In similar fashion each of the other generators 271, 272, and 273 selectively produces first a negative going pulse and then a positive going pulse when their respective inputs 286, 288, and 290 are energized, or alternatively produce first a positive going pulse followed by a negative going pulse when their other inputs 292, 294, and 296 are energized. FIGURE 12 also shows that the pulse pairs produced from generators 270–273 are also spaced in time one from the other without overlap such that the drive windings 224–227 are sequentially actuated. One well known technique of obtaining sequential energization of the generators is by use of serially connected delay lines. Thus delay lines 300, 302, and 304 are connected in a series circuit one end terminal of which is connected with the Increment switch 256. Generator inputs 274, 286, 288, and 290 are connected to this delay line series circuit in the manner shown so that voltage signals arrive at these generator inputs at different times beginning with the generator 270. When switch 256 is closed, voltage first appears at input terminal 274 for energizing generator 270 to produce first a negative pulse and then a positive pulse on drive winding 224. Delay line 300 is designed to prevent the application of this switch 256 voltage to terminal 286 until the positive going pulse 278 from generator 270 has been terminated. Generator 271 is then energized to produce a pair of negative and positive pulses, with delay line 302 preventing the application of the switch voltage to generator 272 until generator 271 has finished its operation. Generator 272 is then fired, producing first a negative and then a positive going pulse. Delay line 304 next applies the switch voltage to terminal 290 of generator 273 so that the remaining drive winding 227 is actuated at a time following the actuation of the other drive windings. FIGURE 12 shows these sequential outputs from the generators, each generator output comprised of a pair of time spaced pulses of opposite polarity. In similar fashion, a group of delay lines 306, 308, and 310 are connected in a series circuit one terminal of which is connected to the Decrement switch 254. These delay lines then permit time spaced application of energizing signals to terminals 280, 292, 294, and 296, so as to cause the sequential operation of generators 270–273 in this order. For these energizing signals, however, each generator first produces a positive going pulse 282 followed by a negative going pulse 284 in the manner shown in FIGURE 12.

In order to place an initial predetermined count into each of the counting columns from which values may then be added or subtracted, a group of switches 312–315 are provided each connected to respective row drive windings 224–227 via respective ganged contacts 316–319. For example, to preset a binary 1 into each element 200 of row 1, the SET switch 238 is closed to place all flip-flops 230 et al. into a binary 1 state so as to generate the field $H_W$ for each column. Switch 312 is moved to its negative terminal and contact 316 closed to produce current flow through winding 224 in a direction to generate the field $H_D(1)$ (FIGURE 9) in each element 200 of row 1. The combination of $H_D(1)$ and $H_W$ therefore rotates the flux in each of these row 1 elements to the B(1) direction. Switches 313, 314, and 135 are likewise set to either their positive or negative terminals so as to store either a 1 bit or a 0 bit in the elements 200 in their respective associated rows 2–4.

An output signal is taken from each counter column across the sense winding of that element therein which is the last to be pulsed in the generator sequence of FIGURE 12. In FIGURE 8 this is seen to be the row 4 element of each column. Output terminal 320 is connected across the sense winding of said row 4 element in column 1, while a similar output terminal 322 is connected across the row 4 element in column 10. The row 4 elements in each of the remaining columns 2–9 also have output terminals similarly connected thereacross.

The operation of the system in FIGURE 8 will now be described. For incrementing by a multibit number, the following rules are executed on each bit thereof in sequence beginning with the lowest binary order and ending with the highest binary order:

(1) If a bit is 1, change it to 0 and proceed to the next higher order bit;

(2) If a bit is 0, change it to 1 and refrain from changing any higher order bit.

For decrementing by 1, the same rules (1) and (2) are used but with the bit values 0 and 1 interchanged. That is to say, if a bit is 0 change it to 1 and proceed to the next higher order bit, whereas if a bit is 1 change it to 0 and then stop. The binary order significance ($2^0$, $2^1$, $2^2$, etc.) of the elements 200 in each column is determined solely by the sequence in which their drive windings are actuated and not by their physical locations. In FIGURE 8, therefore, each row 1 element stores the lowest order or least significant bit of the number whereas the row 3 element of each column stores the highest order or most significant bit of the number. The row 4 element is merely used to obtain an output from the counter column and so is not considered to store a bit of the number operated upon. Consequently, each counter column in FIGURE 8 is capable of storing and operating upon a three bit number contained in its row 1, 2, and 3 elements.

The operation of incrementing will now be described in detail by considering three counting steps. First assume that before starting any counting operations, an initial positive count of 101 (decimal 5) is to be inserted into each column register. Each column control flip-flop is set to its 1 state by closure of switch 238 in order that each word line of a column has current flow therethrough. Switches 312 and 314 are moved to contact their negative terminals, while switches 313 and 315 are moved to contact their positive terminals. Ganged switches 316–319 are then closed to provide negative current flow in lines 224 and 226 in the direction of arrow 210 (FIGURE 9), while positive current flow occurs in digit lines 225 and 227 in the direction of arrow 212. The row 1 and row 3 elements of each column are therefore driven to their binary 1 flux condition B(1) (FIGURE 10), while the row 2 and row 4 elements of each column are driven to their binary 0 flux condition B(0). Contacts 316–319 are now opened and switch 244 is temporarily closed to place each column flip-flop into its Clear condition to terminate the word winding current. Next assume that only the numbers in columns 1, 4, and 10 are to be incremented during the counting operation. Each of the flip-flops associated with these three columns is now once again placed into its 1 state by means of signals applied to their respective inputs 530, 533, and 539 via OR gates 234 et al. Thus during the following sequential operation of generators 270 et al. only word windings of columns 1, 4, and 10 will have current flow therethrough.

Table 2 below should now be referred to for a complete understanding of the count operation.

application of a negative going pulse and then a positive going pulse on its respective drive winding. The first generator to be energized is 270 from which first appears a negative going pulse 276 applied to drive winding 224 in order to drive each row 1 element of columns 1, 4, and 10 to its binary 1 state. However, since each said row 1 element already is in its binary 1 state, there can be no rotation of the flux therein because the field $H_D(1)$ is applied in the same direction as lies the existing flux B(1). Consequently, there is no E.M.F. induced on the output sense windings of columns 1, 4, and 10 because there is no change in a core 202 remanent magnetization linking these sense windings. The column 1, 4, and 10 flip-flops therefore remain in their 1 state. The second pulse of the pair from generator 270 is a positive going signal 278 which attempts to switch each of the selected row 1 elements from a binary 1 flux state to a binary 0 flux state. This switching actually occurs so that each sense winding associated with columns 1, 4, and 10 has induced thereon a negative going signal which is applied across its respective transformer as a negative going signal to AND gate 248 of column 1 (and similar AND gates in columns 4 and 10), and as a positive signal to AND gate 246 of column 1 (and similar AND gates in columns 4 and 10). The negative signal to AND 248 continues to prevent it from generating an output even though switch 256 is now closed, whereas the open contact 254 prevents AND gate 246 from generating an output even though it now receives one positive input. Furthermore, both AND gates in each of the columns 4 and 10 are likewise disabled whereby the flip-flops in each of these three columns remain in their 1 condition.

After generator 270 has finished applying its pair of pulses to winding 224, generator 271 is energized to first apply a negative going and then a positive going pulse to winding 225. The negative going pulse switches the row 2 elements of columns 1, 4, and 10 from their 0 state to their 1 state, thereby inducing on the associated sense windings positive going signals. The positive going signal on output sense winding 220 of column 1 is applied across its respective sense winding tranformer 260 as a positive signal to AND 248 and as a negative signal to AND 246. OR gate therefore produces a signal which resets flip-flop 230 into its 0 state thus terminating current in word winding 216. In column 10, AND gate 252 is also responsive to a positive signal from the secondary of transformer 264 in order to reset flip-flop 232 into

TABLE 2 (INCREMENT)

| Col. 1 | | | | Col. 4 | | | | Col. 10 | | | | Row |
|---|---|---|---|---|---|---|---|---|---|---|---|---|
| (a) | (b) | (c) | (d) | (a) | (b) | (c) | (d) | (a) | (b) | (c) | (d) | |
| 1 | 0 | 1 | 0 | 1 | 0 | 1 | 0 | 1 | 0 | 1 | 0 | $1(2^0)$ |
| 0 | 1 | 1 | 0 | 0 | 1 | 1 | 0 | 0 | 1 | 1 | 0 | $2(2^1)$ |
| 1 | 1 | 1 | 0 | 1 | 1 | 1 | 0 | 1 | 1 | 1 | 0 | $3(2^2)$ |
| 0 | 0 | 0 | 1 | 0 | 0 | 0 | 1 | 0 | 0 | 0 | 1 | 4 |

Table 2 shows only the contents of the column 1, column 4, and column 10 registers for each of the three counting steps, inasmuch as all other columns are not affected by the actuation of the drive generators 270 et al. Each of the column positions of Table 2 is in turn divided into several headings labelled (a), (b), (c), and (d) for indicating the value of the number held therein both initially and after termination of each counting step. The (a) heading for each column shows the initial number 101 placed therein by switches 312–315, whereas the (b), (c), and (d) headings show how the number in each counter is incremented by 1 at the end of each complete generator sequence. Switch 256 is closed to commence the first counting step so that each film element 200 in a selected column is successively first driven toward its 1 state and then toward its 0 state by the its 0 state and terminate current in word winding 218. Similar circuitry in column 4 also terminates its word winding current. Consequently, when the second pulse of positive going polarity appears from generator 271, it is unable to switch the row 2 elements of columns 1, 4, and 10 back into the state from their newly established 1 state. These row 2 elements therefore now store binary 1.

After the operation of generator 271, generators 272 and 273 are operated in sequence each producing first a negative going and then a positive going pulse on the respective drive windings 226 and 227. However, since the flip-flops of columns 1, 4, and 10 are reset to their 0 state during operation of generator 271, any current in these drive windings is unable to change the binary values held in the row 3 and row 4 elements in each of these columns. Consequently, at the end of the first generator sequence, or counting step, the binary value stored in the respective row 3, 2, and 1 elements of each of the columns 1, 4, and 10 is 110 (decimal 6). The count in the other columns 2, 3, and 4–9 still remains at 101. The row 4 elements of all columns still store binary 0.

After generator 273 has been actuated, switch 256 may be opened to reset the generator sequence circuits to a quiescent condition in preparation for a subsequent counting step. Switch 244 is also closed momentarily to supply a pulse through OR gates 240 et al. to insure clearing of all flip-flops 230 et al. to their binary 0 condition. Each flip-flop in counting columns 1, 4, and 10 may be set once more to its binary 1 condition by means of individual input signals applied via lines 530, 533, and 539. Switch 256 is closed once again to add a value of 1 to each of the numbers in columns 1, 4 and 10 in the following manner. The negative going pulse 276 from generator 270 causes each row 1 core of these selected three columns to be switched from its binary 0 state to its binary 1 state thereby inducing positive going signals in the respective sense output windings. In column 1 this positive signal is applied across transformer 260 to once again enable AND gate 248 to reset flip-flop 230 into its binary 0 condition. The flip-flops in columns 4 and 10 are likewise reset to 0. Consequently, the next following positive pulse signal 278 from generator 270 fails to return these row 1 elements back to their 0 value condition, because by this time the current in the word windings has been terminated. Pulses from generators 271, 272, and 273 likewise fail to change the bit values of the row 2, 3, and 4 elements of these three columns so that the number standing therein at the end of the second counting step is as indicated in heading (c) of Table 2. The previous value 110 (decimal 6) has been incremented to a value 111 (decimal 7). Switch 256 can now be opened to prepare the system for a third counting step.

If the same counting columns 1, 4, and 10 are to be incremented during the third counting sequence, only the flip-flops thereof are once again set to the binary 1 condition by respective input signals applied via lines 530, 533, and 539. Switch 256 is then closed to begin the generator sequence. The negative pulse 276 from generator 270 finds the row 1 elements already in their binary 1 condition such that no positive signal is induced on the respective sense windings. Consequently, the selected column flip-flops are still in their 1 condition when the positive going signal 278 is applied to windings 224. This positive pulse drives each selected row 1 element from its binary 1 state to its binary 0 state without, however, causing either of the column AND gates to generate an output signal because of the negative signal induced on the output sense winding. The selected column flip-flops therefore are still in their 1 condition at the time that generator 271 begins to apply pulses to winding 225. It will be observed from Table 2 that both the row 2 and row 3 elements of the selected columns also store a binary 1 which is changed to binary 0. When generator 273 is finally actuated, the binary 0 contained in the row 4 elements of these three columns is changed to binary 1, thereupon inducing a positive signal on the sense windings which is of proper polarity to cause the selected column flip-flops to be reset to their 0 condition. Furthermore, when the row 4 element of each column 1, 4, and 10 is switched from 0 to 1, an output signal appears at the respective output terminal for each of these three columns to indicate that the number therein is now at some predetermined value, i.e. 000 (decimal 0).

In order to decrement a count in each of several selected columns, the flip-flops of all columns are first cleared to their 0 condition by a pulse from switch 244 through OR gates 240 et al., then the flip-flops of said selected columns are set to their 1 condition by respective inputs thereto on lines 530 et al. Switch 254 is now closed to permit each generator in sequence to produce first a positive and then a negative going pulse on the respective drive windings. Table 3 given below illustrates the decrementing of selected columns 1 and 8 of the counter bank, with each column assumed to have been set to an initial count of 011 (decimal 3) by means of switches 312–315. The row 4 element of each selected column is set to 0. The flip-flops of columns 1 and 8 are then set to 1 by pulses on their respective input lines 530 and 537, and switch 254 is closed to begin the first counting step. Generator 270 now applies a positive pulse 282 to winding 224 which switches the row 1 elements of columns 1 and 8 from their binary 1 to their binary 0 state. This flux switching generates negative going signals on the respective sense windings which, when applied across the sense winding transformers, causes a positive signal to be applied to AND gate 246 and a negative signal to be applied to AND gate 248 in the case of column 1, with similar AND gates in column 8 also receiving similar signals. Since AND gate 246 in column 1 also has applied thereto a positive signal from now closed switch 254, it resets flip-flop 230 back to 0 thus terminating current in word winding 216. Current in the column 8 word winding is similarly discontinued. Thus, when the negative going signal 284 is now applied by generator 270, it fails to return the row 1 elements back to a binary 1 state due to the absence of this word winding current. Pulses applied to respective drive windings by generators 271–273 likewise fail to change the bits stored in the row 2, 3, and 4 elements of columns 1 and 8, so that the number contained in each at the end of the first generator sequence is that given by the headings (b) of Table 3. It can therefore be seen that the original count of 011 (decimal 3) has been decremented by 1 to a count of 010 (decimal 2). Switch 254 is now opened to reset the generator circuits for a succeeding count step.

To condition the counter bank for a second counting sequence, all flip-flops are cleared to their binary 0 condition by a switch 244 pulse. If the same columns 1 and 8 of the matrix are to be decremented during the second count step each has its flip-flop once again set to binary 1 by signals on their respective inputs. Switch 254 is once again closed to commence the generator sequence. The signal 282 from generator 270 produces the field $H_D(0)$ which attempts to drive the selected row 1 elements to the binary 0 state. However, each row 1 element of columns 1 and 8 already is in its binary 0 state at this time. When a negative going signal 234 next appears from generator 270, it drives the row 1 elements from the binary 0 to the binary 1 condition which thereupon induces positive going signals on the respective sense output windings. This positive going signal is applied as a negative signal to AND gate 246 in column 1 (and to a similar AND gate in column 8) so as to prevent these AND gates from resetting their respective flip-flops. Although the sense winding transformers also apply a positive signal to AND gate 248 (and to a similar AND gate in column 8) these latter two AND gates cannot generate signals because switch 256 is open at this time. Therefore, the column 1 and column 8 flip-flops remain in their 1 condition by the time the generator 271 is activated. The first applied positive pulse from generator 271 causes the selected row 2 elements to switch from binary 1 to binary 0 and thus produce negative signals on the sense windings which are of proper polarity to reset the column flip-flops. Thereafter, the column 1 and 8 elements cannot have their values changed by pulses from the remaining generators 272 and 273. The count in each column at the end of the second generator sequence is 001 as shown in heading (c) of Table 3.

If a third counting step is initiated with the column 1 and column 8 flip-flops once again set, the count is changed therein from 001 (decimal 1) to 000 (decimal 0). The row 4 element still remains in its binary 0 condition since the selected column flip-flops will have been reset prior to actuation of generator 273. However, if a fourth counting step is subsequently commenced, the binary 0 in each of the row 4 elements of columns 1 and 8 is changed to binary 1, whereupon an output signal is produced at the said respective output terminals. The row 3, 2, and 1 elements of these selected columns will store binary 1's at the conclusion of this fourth counting step, so that the number held in column 1 and 8 is 1111 which conveniently may be considered as −1 in decimal notation.

TABLE 3 (DECREMENT)

| Col. 1 | | | | | Col. 8 | | | | | Row |
|---|---|---|---|---|---|---|---|---|---|---|
| (a) | (b) | (c) | (d) | (e) | (a) | (b) | (c) | (d) | (e) | |
| 1 | 0 | 1 | 0 | 1 | 1 | 0 | 1 | 0 | 1 | 1($2^0$) |
| 1 | 1 | 0 | 0 | 1 | 1 | 1 | 0 | 0 | 1 | 2($2^1$) |
| 0 | 0 | 0 | 0 | 1 | 0 | 0 | 0 | 0 | 1 | 3($2^2$) |
| 0 | 0 | 0 | 0 | 1 | 0 | 0 | 0 | 0 | 1 | 4 |

There are several further points of interest with respect to the system of FIGURE 8. The time interval between the two opposite polarity pulses coming from any generator must be at least as long as the time required for a column flip-flop to switch from its 1 condition back to its 0 condition. This is so, since the second applied pulse of a pair must not be allowed to switch flux direction whenever the first applied pulse of that pair has produced a signal on the output sense winding which is of proper polarity to reset the associated flip-flop to its 0 condition. Another point of interest is the fact that the row 4 elements can be initially set to a binary 1 condition if so desired rather than the binary 0 condition shown in Tables 2 and 3 in order that output signals of an opposite polarity may be obtained. There is one other consideration which should be taken into account. FIGURE 13 shows a vector diagram for the two rotational processes of film magnetization encountered in each core 202. Assume that every core in a particular column is in its binary 0 state at the time that the column flip-flop is set to its 1 condition. Upon initiation of current in the word winding, the field $H_W$ is produced which is applied transverse to the PMA of each element in the column. Although $H_W$ by itself is not sufficient to rotate the flux to the opposite B(1) direction, it is sufficient to slightly rotate the flux from its B(0) position through small angle $\alpha$ to a $B_1$ position. If the $H_D(1)$ field is later applied to these column elements, the element flux is further rotated through angle $\phi$ to a B(2) position which is not quite parallel to the PMA because of the continued effect of the transverse field $H_W$, the flux at $B_2$ falls to the B(1) position along the PMA. FIGURE 13 consequently shows that there is a slight rotation of the element flux even when only the word field $H_W$ is applied to a film, whereas a much larger rotation occurs when both the $H_D(1)$ and $H_W$ fields are concurrently applied. Both cause the same polarity of induced signal in the sense line although it is only when an $H_D$ field is applied that said output signal is considered to have any logical significance. However, if all or most of the elements in a column are in their binary 0 state at the time that the column flip-flop is initially set on, then sense winding signals induced by flux rotation through angle $\alpha$, when added together in the common sense line, could look like a switching signal of the magnitude induced when the rotation is through angle $\phi$. This pseudo output signal would be of proper polarity to reset the column flip-flop even before any counting sequence could begin. In order to avoid such erroneous resetting, the column flip-flops are preferably designed to be insensitive to input signals applied to their 0 condition side immediately following a change to their 1 state for a period of time longer than the time required for the sense winding induced signals to feed back through the transformers and gating logic. Other techniques could be employed to prevent the column flip-flops from being reset in error.

FIGURE 14A is a simplified version of FIGURE 8 wherein only incrementation or decrementation, but not both, can occur. Both AND gates and the transformer of each column are eliminated, with each column sense winding being connected via a driver directly with the OR gate to the 0 condition input side of the column flip-flop. For incrementing only, switch 254 and delay lines 306, 308 and 310 are further eliminated from FIGURE 8, while each driver, as 262 in FIGURE 14A, is designed so that a positive output appears therefrom whenever a 0 to 1 change is made in its associated column element. On the other hand, where the simplified circuitry is to perform only decrementation, then switch 256 and delay lines 300, 302, and 304 may be eliminated while each sense winding driver is designed to generate a positive signal for a 1 to 0 flux change in its associated column element.

FIGURE 14B shows another, more extensive, modification of the FIGURE 8 system when only incrementing of the counter bank is desired. The change here contemplated involves the total number and connections of the logic elements for each column. Each column flip-flop in FIGURE 14B can be set to its 1 condition by a SET signal applied upon closing of a switch such as switch 238 in FIGURE 8. The flip-flop 326, for example in column 1, can be reset to its 0 state by a Clear signal applied as from a switch 244 in FIGURE 8. Each column flip-flop further has two complementing inputs connected to a common input lead shown as conductor 328 for column 1. A negative signal supplied to lead 328 changes the state of the flip-flop from 1 to 0 and from 0 to 1. A column 1 sense winding 330 detects a positive signal when a film in the column switches from a 1 state to the 0 state and a negative signal when a film switches from the 0 state to the 1 state. A single OR gate 332 for column 1 is designed to pass only negative signals. The flip-flop 326 in the 1 state causes current to flow in its associated word line 334, and a film in column 1 can be switched by a pulse on a drive winding 336 only in the presence of current in the word line. Under the assumption that flip-flop 326 is initially in its 0 condition, a negative input pulse applied via 530 to OR 332 sets the flip-flop to its 1 state whereupon a transverse field is applied to each element of its associated column 1. The column drive windings are then sequentially pulsed as in FIGURE 8 by pairs of alternating polarity pulses, the first pulse being negative going and the second pulse being positive going. If a film switches from 0 to 1 at the application of a negative pulse to its digit line, the negative signal induced on its associated sense line is transmitted by OR gate 332 to input lead 328 and thus returns the flip-flop to its 0 state so that subsequent digit line pulses cause no more films on that word line to switch.

FIGURE 14C shows still another modification of FIGURE 8 which is particularly useful where null outputs are to be counted and EMF signals ignored as is the case for the coincidence matrix of FIGURE 5 and/or 5A. Each column of the modified counter bank, as shown by column 1 in FIGURE 14C, is comprised of a flip-flop 327 which is set ON by a SET signal as applied by switch 238 in FIGURE 8. The 1 state of the flip-flop causes current to flow in its word winding 325 so that the column 1 elements 200 can be switched by appropriate current pulses in the horizontal drive windings. The column 1 sense winding 329 is fed through a driver 331 back to an OR gate 333 which in turn is connected to the 0 condition input of flip-flop 327. Where only incrementation or decrementation is desired, as in FIGURE 14A, no AND gating logic need be provided. Also supplied as inputs to OR gate 333 are a CLEAR signal (as from switch 244 in FIGURE 8) and a signal appearing on coincidence matrix sense winding 165 from FIGURE 5. Similar OR gates in columns 2–10 would also receive signals from respective ones of the remaining coincidence matrix sense windings 166-174. In operation, all column flip-flops are set to 1 prior to interrogating the coincidence matrix by means of contacts 185-189. Those EMF signals thereafter appearing on the coincidence matrix sense windings will reset their respective column flip-flop to binary 0, but null signals permit their column flip-flops to remain at 1. Thus, the advantage of the FIGURE 14C construction is that the additional flip-flops 441-450 and AND gates 454-463 can be eliminated from the coincidence matrix output without sacrifice of the required counting function.

FIGURE 15 illustrates still another embodiment of a thin film counting bank wherein selected counting register columns may be simultaneously incremented. A plurality of magnetic thin film column elements 340 are arranged in a group of columns and rows. The number of columns, for example 10 (of which only columns 1 and 10 are shown in detail), depend upon the number of multibit values to be simultaneously incremented. The number of rows, for example, four, depend upon the number of bits comprising each word to be incremented with one of the element rows being provided merely to detect counter overflow or underflow. Before continuing with the description of FIGURE 15, reference is now made to FIGURES 16 and 17 for a description of the construction and operation of each magnetic thin film element 340 of the array. Each element 340 is comprised of a magnetic thin film core 342 of the uniaxial and anisotropic variety have a preferred magnetic axis lying in the direction indicated by the double-ended arrow. Inductively coupled with film 342 is a sense winding 344 whose axis is transverse to the PMA at substantially a right angle therewith. Also inductively coupled to film 342 is a word winding 346 adapted to conduct current in either direction therethrough for generating a magnetic field $H_W$ within core 342 in either direction along its PMA. A drive winding 348 is further inductively coupled with core 342 such that its axis lies substantially parallel to the PMA so that current flow therethrough in the direction of arrow 354 produces a field $H_D$ which is transverse to the PMA. All of the windings 344, 346, and 348 are electrically insulated one from the other. FIGURE 17 is a vector diagram showing the general orientation of the external fields produced by windings 346 and 348, together with the general direction of the flux B within core 342. In the absence of any external field applied to core 342, the remanent magnetization therein lies approximately parallel to its PMA in either the direction indicated by B(1) or the direction indicated by B(0), with the number in the parentheses indicating the binary value assigned to each flux direction. However, upon application of current to drive winding 348 in the direction of arrow 354, it is assumed that a field $H_D$ is generated in the direction shown in FIGURE 17 which is of sufficient magnitude to rotate the flux in core 342 to the direction shown by $B_T$. If field $H_D$ is then subsequently terminated, the flux within core 342 has the option to fall to either side of its perpendicular $B_T$ so as to lie either in the B(1) direction or the B(0) direction. The actual direction in which the flux falls is determined by the direction of a longitudinal field $H_W$ which is essentially parallel to the core PMA. This field $H_W$ is produced by current in the word winding 346. If current flow in winding 346 is in the direction of arrow 350, the field $H_W(1)$ causes the remanent magnetization of core 342 to fall in direction B(1). On the other hand, if current flow in winding 346 is in the direction of arrow 352, a field $H_W(0)$ exists which causes remanent magnetization in core 342 to fall in the direction of B(0) when field $H_D$ terminates. Since the sense winding 344 is inductively coupled to core 342 at an angle transverse to its PMA, a voltage of one polarity will be induced in the sense winding whenever the core flux rotates from B(0) to $B_T$ or reverts to the position B(1) from $B_T$, while a voltage of opposite polarity is induced in sense winding whenever the core flux rotates from B(1) to $B_T$ or reverts from $B_T$ to B(0).

Returning now to FIGURE 15, the word windings 346 of all of the elements 340 within the same column are connected in series so as to form a common word winding individual to each column of the matrix. For example, the word winding 356 is common to all of the elements in column 1 of the matrix, while a word winding 358 is common to all of the elements in column 10. Columns 2-9 likewise have word windings individual thereto. In similar fashion, the sense windings of all elements 340 in the same column are connected in series to form a winding individual to each matrix columns. This is shown in FIGURE 15 by sense windings 360 for column 1 and 362 for column 10, with columns 2-9 having similar individual sense windings coupled to all elements in the respective columns. In order to provide cancellation of signals directly induced on a sense winding by mutual coupling between it and a word winding, each column sense winding is seen to be formed with an upward return leg to ground so that EMF signals are induced therein which equally oppose the signals induced in the downward leg. The drive windings of elements in the same matrix row are likewise connected in a series circuit to thereby form input drive windings common and individual to each row. These drive windings are identified as 364-367 for rows 1-4, respectively.

Interconnected with the word winding and sense winding for each column are a plurality of logic elements whose number and configuration are identical for each matrix columns. The elements associated with column 1 will be described in detail with the understanding that each of the other columns 2-10 is similarly constructed. A bistable element, such as flip-flop 370, is provided which can be individually set to either a 1 condition or a 0 condition by signals applied to the respective inputs thereto. The flip-flop 370 can be set to its 1 condition by either of two signals applied via an OR gate 372. One of these signals is applied whenever switch 374 is closed to generate a SET signal applied in common to all of the matrix columns. The other input signal to OR gate 372 comes via the input lead 530 individual to column 1 which is pulsed whenever said column count is to be incremented by 1. A second OR gate 376 is provided to which are applied two signals either of which can set flip-flop 370 to its 0 condition. One such signal occurs whenever switch 378 is closed to generate Clear signal applied in common to all of the matrix columns. The other signal to OR gate 376 is provided via a delay line 380 from the output of an AND gate 382. AND gate 382 has inputs from a variety of sources. One such input is from the 1 output of flip-flop 370 while another input is from an inverter element 384. A third input to AND gate 382 is provided by a CLOCK signal which is applied in common to all of the columns. A second AND gate 386 derives inputs from the 0 output terminal of flip-flop 370 and from the 1 output of a second flip-flop 389. The CLOCK signal is also applied to AND gate 386 and the 1 output of flip-flop 389 is applied to inverter 384. Both AND gates 382 and 386 feed into an OR gate 390 which in turn is connected to a 1 driver 392. This 1 driver has its output connected to the word winding 356 of column 1. The purpose of the 1 driver 392 is to generate current in the word winding 356 in either one of the two directions indicated by arrows 350 and 352 of FIGURE 16. When driver 392 is actuated by an output from OR gate 390, it is assumed to produce current in the direction of arrow 350 so as to generate the field $H_W(1)$ shown in FIGURE 17. However, during the absence of a signal from OR gate 390, driver 392 is biased to produce current flow in the opposite direction 352 so as to generate the field $H_W(0)$.

An induced EMF signal on sense winding 360 is applied via a driver 394 to the input of Strobe gate 388. Strobe gate 388, upon application of a Strobe signal, passes only a positive input signal to its output. This output in turn is connected to the 1 input of flip-flop 389. Thus, each strobe gate permits the blanking out of any unwanted signals from the sense winding, since it receives a STROBE pulse only at the time that a signal is expected from the sense winding driver.

Each of the row drive windings 364–367 is connected to a respective one of pulse generators 395–398. Each generator, when an input signal is applied thereto, generates an output pulse sufficient to cause current flow in its respective drive winding to thereby produce the transverse field $H_D$ shown in FIGURE 17. The generators are actuated in sequence conveniently provided by a plurality of delay lines 399, 400, and 401 connected in series circuit and from which are tapped inputs 402, 403, 404, and 405 to respective generators 395–398. One end of the delay line series circuit is connected with a switch 406. Thus, when switch 406 is closed, a voltage signal is first applied to input 402 of generator 395 so as to enable it to produce the drive pulse for winding 364. The first delay line 399 delays application of voltage to the input 403 of generator 396 until such time as the pulse from generator 395 has disappeared. Generator 396 is then actuated in turn with delay 400 being sufficient to prevent actuation of generator 397 until current flow is terminated in winding 365. Delay 401 likewise causes generator 398 to be the last operated.

In order to generate a STROBE, CLOCK and flip-flop 389 CLEAR signal for each of the generator 395–398 pulses, an OR gate 385 accepts each of said generator pulses for inversion by invertor 387. Each such inverted pulse is directly applied to the clear input of flip-flop 389 (and similar flip-flops in each of the remaining columns 2–10). The output from OR 385 via invertor 387 is also delayed slightly by a delay line 391 and then used as the STROBE signal to gate 388 (and the Strobe gates of columns 2–10) so that, if a positive signal is induced on a sense winding by a flux change from B(1) to $B_T$, a STROBE pulse arrives at gate 388 at the same time as does said induced signal. Another delay line 393 is used to generate a further delayed CLOCK signal from each of the generator pulses. Its purpose is to provide synchronization between each generator pulse and the current pulse in a column word winding, with there being a small overlap between these two pulses such that the generator pulse is terminated while the word pulse is still on. It should also be noted that flip-flop 389 is always cleared to 0 prior to the appearance of each CLOCK pulse, but a positive signal on sense winding 360 is strobed through to set said flip-flop to its 1 condition in time to apply a positive signal to AND gate 386 during the CLOCK pulse period.

The operation of the system in FIGURE 15 may be more readily understood by the reference to Table 2 above. Assume that prior to a first incrementing step, a bit configuration of 0101 respectively exists in the row 4, 3, 2, and 1 elements of each column such as is shown in heading (a) of Table 2. This initial bit configuration may have resulted from previous incrementing steps, or may be provided by additional means for setting each column to any desired initial count, as by switches 312–315 in FIGURE 8. Next assume that this initial number of 101 (decimal 5) is to be incremented only in columns 1, 4, and 10. After clearing all column flip-flops to 0, input signals are selectively applied only to the 1 input terminals of the flip-flops of columns 1, 4, and 10. For example, flip-flop 370 of column 1 is set to its 1 condition by a pulse applied on lead 530 to OR gate 372, while a pulse on lead 539 is applied to OR gate 412 in column 12. From this point on, description of the counter bank operation is limited to the incrementing of column 1, but it is to be understood that identical functions are occurring in both column 4 and 10. The setting of flip-flop 370 to its 1 condition thereby permits AND gate 382 to be responsive to signals applied to its other two input terminals, but shuts AND gate 386. Switch 406 is now closed to start the first generator sequence. Generator 395 issues a pulse to drive input winding 364 which creates a field $H_D$ at all row 1 elements 340 so as to rotate the remanent magnetization in each core 342 from its B(1) direction along the PMA to its $B_T$ direction transverse to the PMA. In so doing it is assumed that the sense winding 360 has a signal of positive polarity induced therein which is strobed through gate 388 to set flip-flop 389. A negative signal is applied to AND gate 382 to thereby prevent a CLOCK pulse from passing therethrough even though flip-flop 370 also applies a positive signal thereto. Therefore, no output is obtained from AND gate 382, nor is there any output from AND gate 386 due to the fact that flip-flop 370 applies a negative signal to one of its inputs. The driver 392 therefore remains in its 0 condition whereby the D.C. bias products a current through word winding 356 in the direction of arrow 352 setting up field $H_W(0)$. The pulse from generator 395 eventually is terminated so as to discontinue the field $H_D$. The transverse flux $B_T$ now falls to a direction B(0) along the PMA because of field $H_W(0)$. Thus, the 1 bit stored in the row 1 element of column 1 has been changed to binary 0 upon application of the pulse to digit line 364.

Generator 396 now produces a pulse on drive line 365 of the row 2 elements. Each row 2 element contains a binary 0 bit as evidenced by the remanent flux direction B(0). Upon application of the pulse from generator 396 a field $H_D$ is produced which rotates the flux from B(0) to $B_T$, thereby inducing a negative going signal in sense winding 360. This negative sense signal fails to pass through Strobe gate 388 so that flip-flop 389 remains in its 0 condition after being cleared. Consequently, when the CLOCK pulse appears to AND gate 382, all of its inputs are positive thereby generating an output signal to driver 392 which changes the current in winding 356 to a direction shown by arrow 350. When the current in drive winding 365 is terminated by the disappearance of the pulse from generator 396, flux $B_T$ now falls in the direction of B(1) because of the field $H_W(1)$ now applied by current in winding 356. Thus, the 0 bit in the row 2 elements of columns 1, 4, and 10 has been changed to 1. The output from AND gate 382 is further transmitted via delay 380 back to OR gate 376 to thereby switch flip-flop 370 into its 0 condition. The purpose of delay 380 is to insure that flip-flop 370 is not switched from its 1 condition prior to the time that the pulse on drive winding 365 disappears. The reason for this is that the 1 driver 392 must be kept energized by the output from AND 382 until the flux has been returned to B(1) along the PMA. By the time that generator 397 is energized, flip-flop 270 is not in its 0 condition. The pulse on winding 366 rotates the flux in each row 3 element from B(1) to $B_T$ and in so doing produces a positive going signal on sense output winding 360. A positive signal is thus applied to AND gate 386 which is also enabled by the positive output from the 0 terminal of flip-flop 370. Thus, upon the appearance of a CLOCK pulse AND gate 386 now operates to energize driver 392 for applying a current in the direction of arrow 350 so as to produce the field $H_W(1)$. The presence of this field at the time that the pulse disappears from winding 366 causes flux in the row 3 element to rotate back to B(1), thus restoring binary 1.

When generator 398 is finally energized, the field $H_D$ rotates the flux in the row 4 element from a direction B(0) to $B_T$ thus producing a negative signal on sense winding 360. This negative signal fails to set flip-flop 389 to 1, thus preventing AND gate 386 from producing an output signal upon occurrence of a CLOCK pulse. AND gate 382 is also not permitted to generate an output due to the 0 condition of flip-flop 370. Consequently, neither AND gate 386 or 382 generates an output during the pulsing of drive winding 367 and driver 392 fails to reverse current in the word winding 356 from its normally biased direction. When the pulse disappears from winding 367, the continued presence of the field $H_W(0)$ causes the flux in the row 4 element to return to $B(0)$ thus restoring the binary 0 bit therein. At the termination of this first generator sequence, the bit configuration held in the column 1 elements is as shown in heading (b) of Table 2, with like bits also being held in column 4 and column 10. It is also to be noted that for each of the other columns 2, 3, 5–9, in drive windings 364–367 also cause the same initial flux rotations from $B(0)$ or $B(1)$ to $B_T$ as occurred in the selected columns 1, 4, and 10. However, since their flip-flops 370 et al. are always in the 0 condition, all of their bits are recirculated without change in value.

FIGURE 18 illustrates schematically a form of ZEROES counter which totalizes the number of columns of the counter bank having a final predetermined count therein. For example, if the thin film counting matrix of FIGURE 8 were utilized as the counter bank component of the character correlation system, it may be necessary not only to determine those columns in which the initial value has been incremented or decremented to some final predetermined value, but also the total number of columns wherein said predetermined final value resides at the conclusion of the character correlation analysis. For the purpose of this discussion, assume that there must be determined the total number of columns wherein the row 4 element has been switched from a binary 0 state to a binary 1 state. As previously mentioned during the description of FIGURE 8, this particular rotation of flux occurs when the three bit value changes from 111 to 000 during an incrementing step, or from 000 to 111 during a decrementing step. For either case, an induced EMF signal is generated at the respective column output terminal such as 320 for column 1. FIGURE 18 therefore provides a group of bistable flip-flops 470–479 each of which is connected to a respective one of the column output terminals and responsive to a switching signal appearing thereon for being set to its 1 condition. Thus the bank of flip-flops 470 to 479 indicate by their respective 1 or 0 conditions those counting columns which have reached some predetermined final count, as evidenced by the switching of their row 4 elements. Switch 480 may be provided to initially clear all of the flip-flops 470–479 to their 0 condition in preparation for the receipt of any signal from the counter bank. After those flip-flops have been set to 1 according to those columns which have reached the final predetermined count, the total number of the flip-flops in the 1 condition may be summed by means of any well known mechanism such as a stepping switch 482 which scans in sequence the 1 output terminals of flip-flops 470–479 in order to generate a serial train of pulses, equal in number to the number of flip-flops set to 1, which are then applied to a counter 484. The stepping of switch 482 may be accomplished by any step control means 486 selectively actuated by switch 481. After switch 482 has scanned all of the flip-flops, the value in counter 484 indicates the number of columns of the counter bank which have been incremented (or decremented) to the predetermined final count. FIGURE 18 is only representative of circuitry which can be employed for this function, since there are many well known alternative ways of summing the total number of events which occur.

Although the various drive and interrogate currents, as well as other control signals, are shown for the purpose of simplicity in the figures to be generated for the most part by potential sources and mechanical switches, an electronic environment would substitute well known electronic components therefor. For example, each of the X, Y I, and 0 reference bits could be determined by the state of a flip-flop register stage whose outputs in turn are used to selectively energize winding drivers so as to govern the absence or presence and direction of current flow in the horizontal windings of FIGURES 2 and 5.

The operation of each component of FIGURE 1 having been described, several examples will now be given to illustrate the system uses and potentialities. The operation in each example is to first set all columns in the counter bank 26 to some predetermined initial value as by the use of switches 312–315 in FIGURE 8, followed by the performance of a plurality of comparison cycles each of which is comprised of the following sequential steps: (1) interrogate one or more of the search memory fields; (2) interrogate the coincidence matrix; and (3) change the values in selected counting columns. After all of the comparison cycles have been performed, a count is made of the number of columns in the counter bank that have reached a predetermined value.

Example 1

Assume that search field 10 contains an X string forming the following three English words of eight alphabetic characters, with two characters representing spaces between words:

A boy came.

The problem is to count the total number of digraph combinations each comprised of two immediately adjacent English letters. In the word "boy" it is seen that the letters "bo" comprise one such combination and "oy" another. In the word "came," the letters "ca," "am," and "me," respectively are third, fourth, and fifth such combinations. Since the initial word *a* has only one letter, it does not form a part of a combination to be counted. It is further to be noted that since a space exists between words of the string, i.e. between "a" and "boy" and between "boy" and "came," there must also not be counted any combinations having letters of different words, since such letters would not be immediately adjacent as is required by the problem. Thus, combinations such as "ab" ("a" of the first word and "b" of "boy") or "yc" ("y" from "boy" and "c" from "came") are not to be included in the total count.

Table 4 below illustrates the character locations by column of the X string within search memory 10, as well as indicating the interrogating character applied to search memory 10 and the reference bits applied to the coincidence matrix for each of the numbered cycles.

TABLE 4 (K=2)

| CYC | X | CM1 | CM2 | 1 | 2 | 3 | 4 | 5 | 6 | 7 | 8 | 9 | 10 |
|---|---|---|---|---|---|---|---|---|---|---|---|---|---|
|  |  |  |  | a |  | b | o | y |  | c | a | m | e (X String) |
| 1 | a | 1 |  | 0 | 1 | 1 | 1 | 1 | 1 | 1 | 0 | 1 | 1 (CM1) |
|  |  |  |  | 1 | 2 | 2 | 2 | 2 | 2 | 2 | 1 | 2 | 2 (CB) |
| 2 | b | 1 |  | 1 | 1 | 0 | 1 | 1 | 1 | 1 | 1 | 1 | 1 (CM1) |
|  |  |  |  | 1 | 2 | 1 | 2 | 2 | 2 | 2 | 1 | 2 | 2 (CB) |
| 3 | c | 1 |  | 1 | 1 | 1 | 1 | 1 | 1 | 0 | 1 | 1 | 1 (CM1) |
|  |  |  |  | 1 | 2 | 1 | 2 | 2 | 2 | 1 | 1 | 2 | 2 (CB) |
| 4 | d | 1 |  | 1 | 1 | 1 | 1 | 1 | 1 | 1 | 1 | 1 | 1 (CM1) |
|  |  |  |  | 1 | 2 | 1 | 2 | 2 | 2 | 1 | 1 | 2 | 2 (CB) |
| 26 | z | 1 |  | 1 | 1 | 1 | 1 | 1 | 1 | 1 | 1 | 1 | 1 (CM1) |
|  |  |  |  | 1 | 2 | 1 | 2 | 2 | 2 | 1 | 1 | 2 | 2 (CB) |
| 27 | a |  | 1 | 1 | 1 | 1 | 1 | 1 | 1 | 1 | 0 | 1 | 1 (CM2) |
|  |  |  |  | 1 | 2 | 1 | 1 | 1 | 2 | 0 | 1 | 1 | 1 (CB) |
| 28 | b |  | 1 | 1 | 0 | 1 | 1 | 1 | 1 | 1 | 1 | 1 | 1 (CM2) |
|  |  |  |  | 1 | 1 | 1 | 1 | 1 | 2 | 0 | 1 | 1 | 1 (CB) |
| 52 | z |  | 1 | 1 | 1 | 1 | 1 | 1 | 1 | 1 | 1 | 1 | 1 (CM2) |
|  |  |  |  | 1 | 1 | 1 | 0 | 0 | 1 | 0 | 0 | 0 | 1 (CB) |

Each of the columns in the counter bank is set to an initial value which, when decremented by 2, will permit it to be identified and included in the count of the ZEROES counter shown in FIGURE 18. Alternatively, each of the columns in the counter bank could be set to an initial value which, when incremented by 2, would allow it to be identified. However for the purpose of this example, it is assumed that the thin film arrangement of FIGURE 8 is employed in its decrementing mode which means that the initial count placed into each column thereof must be 001 (decimal 1), with the row 4 element being set to 0. When such an initial count is decremented twice, said row 4 element will switch from its binary 0 to its binary 1 state thus giving an indication that 2 has been subtracted from its initial value. A decimal value of 1 is actually set into FIGURE 8 by placing switch 312 to its negative (1) terminal and switches 313, 314, and 315 to their positive (0) positions so as to cause each row 1 element to store binary 1, and each row 2, 3, and row 4 elements to store binary 0. Table 4, however, shows an initial value of $K=2$ so that the final count remaining is decimal 0. This is done merely to avoid the use of negative signs in Table 4 and also to better indicate that a value of 2 is the largest number to be subtracted from whatever initial count is placed into the counter bank.

Prior to the performance of each comparison cycle, each element 130 of the coincidence matrix is set to binary 0 by moving switches 180–184 to their positive terminals (binary 1) and then closing contacts 185–189. The inverters 192–196 invert these reference bits so that a binary 0 flux condition is placed in each element 130. Step 1 of cycle 1 now involves the interrogation of search memory field 10 by letter $a$ as coded on switches 90–94. It will be seen that the first X string character $a$ is stored in column 1, the characters *boy* are stored in respective columns 3, 4, and 5, and the characters *came* are stored in respective columns 7, 8, 9, and 10. Columns 2 and 6 may have stored therein a special character representing a space. Consequently, upon interrogation of search memory field 10 by X reference character $a$, there will be active signal indications induced only on output sense conductors 78–83, 85, and 86 inasmuch as the character interrogated for is found only in columns 1 and 8 of the search memory. Thus, each of the coincidence matrix elements 130 in columns 2–7, 9, and 10 thereof is set to binary 1. Null signal indications are found, therefore, on sense windings 77 and 84 so that the elements in coincidence matrix columns 1 and 8 remain in their binary 0 condition. It will be noted in Table 4 that there is no interrogating character given for either the Y or I search memory fields. This is because the problem does not require that these fields be interrogated during step 1 of any of its comparison cycles.

During step 2 of cycle 1, the coincidence matrix will have only the values in its row 1 elements interrogated with a reference bit whose set value is 1, shown by switch 180, but whose true or actual value as represented in the coincidence matrix is 0 after inversion by I 192. Rows 2–5 of the coincidence matrix are not interrogated during step 2 of cycle 1. However, during cycle 27 later to be described, row 2 of the coincidence matrix will be interrogated rather than row 1. For this reason Table 4 shows the set bit values applied during each cycle to coincidence matrix rows 1 and 2, with a dash indicating that a row is not interrogated for either a 1 or a 0 bit during that particular cycle. Rows 3–5 of the coincidence matrix will never be interrogated for this problem and hence are not included in Table 4. Furthermore, when the coincidence matrix of FIGURE 5 is employed, switch 452 must be temporarily closed before step (2) but after step (1) in order to insure that flip-flops 441 et seq. are all set to binary 1 by the time that the coincidence matrix is interrogated. This is because a coincidence matrix element 130, when it is switched by either its interrogate winding 138 or its drive winding 136, produces a signal on its output sense winding which clears the respective one of flip-flops 441 et al. Switches 520, 521, 522, and 523 are all closed for this particular cycle. If the coincidence matrix of FIGURE 5A is used, then switches 558–561 remain open so that all of the elements in columns 11–14 remain in the binary 0 state.

To interrogate only coincidence matrix row 1 with a true binary 0 value, switch 180 is set to the 1 terminal while switches 181 to 184 are left in their center neutral position. Ganged contacts 185–189 are then closed so that current flows only in interrogate winding 150 of the matrix in a direction such as to change a binary 1 value to a binary 0 value. It will be observed that only those row 1 elements in columns 2–7, 9, and 10 have binary 1's stored therein at the time that step 2 is performed. A rotation of flux in any row 1 matrix element 130 therefore induces an output signal on its respective output sense winding. Thus, sense windings 166–171, 173, and 174 each has an active signal induced thereon, while sense windings 165 and 172 have null outputs indicating that the applied 0 reference bit finds an identical 0 bit in columns 1 and 8 of the row 1 elements. Flip-flops 442–447, 449, and 450 are therefore returned to their 0 condition whereas flip-flops 441 and 448 remain in their 1 condition. At the conclusion of step (2) of cycle 1, therefore, the 1 conditions of flip-flops 441 and 448 indicate that the particular character interrogated for in search memory 10 has been found in columns 1 and 8 thereof.

Step (3) of cycle 1 is now performed and involves the decrementing by 1 of those counting columns which are associated with flip-flops 441 and 448 of FIGURE 5. By now closing switch 446, AND gates 454 and 461 generate signals which set the column 1 and column 8 flip-flops of the counter matrix in FIGURE 8. Next, switch 254 is closed which initiates one sequence of the generators 270–273 in order to subtract 1 from the initial count contained in columns 1 and 8. Table 4 shows that the value in columns 1 and 8 of the counter bank is reduced to decimal 1 from the initial value of decimal 2, but as has been previously explained, the actual count in columns 1 and 8 is reduced to a value of 0 from the initial value of decimal 1. The row 4 elements of columns 1 and 8 are not switched for this particular decrementing operation. Therefore, none of the flip-flops 470–479 will yet be placed in a 1 condition during step (3) of cycle 1.

Cycle 2 of Table 4 is initiated by once again performing step (1) but with a different interrogating character. Switches 90–94 are set for the code identifying letter $b$ whereupon contacts 95–99 are closed to interrogate the search memory field 10 for the presence of letter $b$ in any of its column locations. As seen in Table 4, only column 3 contains letter $b$, which means that every one of the output sense conductors 77–86 except for conductor 79 will have an active signal induced thereon. Consequently, every element 130 of the coincidence matrix except those elements in column 3 will be set to its binary 1 condition during step (1) of cycle 2. Switch 452 is now closed momentarily, thereby setting flip-flops 441–450 to their 1 condition. Step (2) in cycle 2 is now commenced which involves the application of a reference bit of true value 0 only to the coincidence matrix row 1 in a manner identical to the performance of step (2) in cycle 1. Since a 0 bit is actually held only by the row 1 element of column 3, there is no switching of the flux therein and thus no active signal induced on output sense winding 167. Binary 1's are stored in all other row 1 elements so that flux reversals occurs therein which induces signals on the remaining output sense windings 165, 166, and 168–174. This means that only flip-flop 443 remains in its 1 condition by the time that step (2) is terminated. During the next following step (3) of cycle 2, only the column 3 flip-flop of the counter bank will be set to its 1 condition. When the generator sequence is now commenced, only the value in column 3 of the counter bank will be decremented, thus leaving it with a count of 1 in Table 4 and an actual count of 0. At the conclusion of cycle 2, therefore, the values in columns 1, 3, and 8 are less than the initial values placed therein, while columns 2, 4–7, 9, and 10 still have the initial values placed therein.

Cycle 3 is next performed during which search memory field 10 is interrogated for letter c at step (1) time, coincidence matrix row 1 is interrogated with the true binary value of 0 at step (2), and column 7 only of the counter bank is decremented by 1. For cycle 4, the search memory field 10 is interrogated for letter d at step (1) without finding same in any of its column locations. Therefore, Table 4 shows that each row 1 element of the coincidence matrix is set to binary 1. At step (2) of cycle 4, the coincidence matrix row 1 is interrogated with a 1 bit inverted to 0 so that every one of the output sense windings 165 through 174 has a signal induced thereon. Consequently, all of the flip-flops 441–450 are returned to 0 at the conclusion of step (2). This means that none of the counter column flip-flops is set in its 1 condition at the time that step (3) is performed. Table 4 therefore shows that at the conclusion of cycle 4, the value remaining in each of the counter bank columns is identical to the value held by it at the end of cycle 3.

During succeeding cycles 5–26, inclusive, the remaining characters e–z of the English alphabet are respectively applied to search memory field 10 during step (1) of each said cycle. During step (2) of each said cycle, only row 1 of the coincidence matrix is examined. Whenever there is a comparison between the X interrogating character as set up on switches 90–94 and a character held in any one of the search memory field locations, the corresponding counter bank column is decremented by 1 at the conclusion of step (3) of that cycle. Thus, at the end of cycle 26, it is seen that counter bank columns 1, 3–5, and 7–10 have each been decremented by 1 from their initial value, thus indicating that these search memory columns contain letters of the English alphabet. Column 2 and column 6 of the counter bank remain with the value originally set therein (decimal 2 in Table 4) to indicate that these search memory columns do not contain letters of the English alphabet. In practice, it must be appreciated that if the counter bank of FIGURE 8 is employed, the initial value placed into each column thereof is decimal 1 so that the actual count standing in the columns 1, 3–5, and 7–10 at the conclusion of cycle 26 will be decimal 0 rather than the decimal 1 as shown in Table 4. The important thing to remember, however, is that no column of the counter bank has yet been decremented to a value which can be detected by the ZEROE'S counter of FIGURE 18.

During the next following cycles 27–52, each letter of the English alphabet, beginning with a is once again sequentially applied to search memory field 10 at step (1) of each cycle. However, at step (2) of each cycle only row 2 of the coincidence matrix is interrogated rather than row 1 as was the case during cycles 1–26. Furthermore, switch 52 in FIGURE 5 is open to effectively disconnect the column 10 counter from the system so that there will be no false counting due to the appearance of null indications on sense winding 174. If the coincidence matrix of FIGURE 5A is instead employed, then switch 558 is temporarily closed just prior to the interrogation of the coincidence matrix so that element 130 at row 2, column 11 is set to 1 in order that a subsequent interrogation of row 2 by binary 0 causes an active indication on sense winding 174. To illustrate the effect of this change in the sampled matrix row, consider cycle 27 shown in Table 4. In step (1) thereof the code for character a is set on switches 90–94 for interrogation of search memory field 10. As in cycle 1, the letter a is found in both column 1 and column 8 which means that output sense windings 155 and 162 have null signal indications thereon, while the remaining output sense conductors have active signals induced thereon. In row 2 of the coincidence matrix (FIGURE 5) there is no element 130 present in column 1 with this fact being represented in Table 4 by a dash. The row 2 element in column 8 is in its binary 0 condition, while the row 2 elements in columns 2–7 and 9 and 10 are set to binary 1 by the said active signals. At step (2) of cycle 27, flip-flops 441–450 in FIGURE 5 are first set to 1 by switch 452, then switch 181 is thrown to its positive terminal (binary 1) such that upon closure of contacts 185–189 current flows only in interrogate winding 151 in a direction to change binary 1 states to binary 0 states of the row 2 matrix elements. It will be noted that no other matrix row is interrogated at step (2) of the cycle. Considering now only those elements in row 2 of the coincidence matrix, it will be observed that columns 2, 3, 4, 5, 6, 7, 9, and 10 are reversed from binary 1 to binary 0 thus inducting active signals in output sense windings 165, 166, 167, 168, 169, 170, 172, and 173. Matrix output sense winding 171 has a null signal thereon due to the fact that the column 8 element of row 2 contains a binary 0 value which is undisturbed by the current in interrogate winding 151. Output sense winding 174 of FIGURE 5 also has a null output, but this indication will be ignored by column 10 of the counter bank because of now open switch 523. It is seen, therefore, that flip-flop 447, which is associated with output sense winding 171, remains in its 1 condition at the conclusion of step (2) of cycle 26. This flip-flop 447 in turn enables the setting of the column 7 flip-flop in the counter bank of FIGURE 8 during step (3) of cycle 27. At this point it may be instructive to compare step (3) of cycle 27 with step (3) of cycle 1. For cycle 1, both the column 1 and column 8 counter flip-flops were set, whereas during cycle 27 only the column 7 counter flip-flop is set. Consequently, during step (3) of cycle 27, column 7 of FIGURE 8 is decremented by 1 so a to now reflect a value of 000 or decimal 0 in Table 4. In practice, column 7 actually is decremented to a binary value 111 whereby all of its elements are switched to a binary 1 state including row 4. Upon switching of the row 4 element in column 7, flip-flop 476 of FIGURE 18 is set to 1 thus indicating that column 7 has reached some final predetermined count. Column counters other than 7 remain at values identical to those held by them at the conclusion of cycle 26.

Cycle 28 is now initiated wherein letter b is used to interrogate the search memory field 10 at step (1), while coincidence matrix row 2 is interrogated at step (2). By tracing through the circuits, it will be seen that the beginning of step (3) of cycle 28, only column 2 of the counting bank will be decremented by 1 rather than column 3 as was the case during step (3) of cycle 2. During the next following cycle 29, letter c is applied to search memory field 10 thus resulting in a character find in column 7 thereof. However, due to the fact that the coincidence matrix row 2 is now interrogated, it is seen that column 6 of the counter bank is decremented by 1 rather than column 7 as was the case in cycle 3. During each of the remaining cycles 30–52 a character find or finds in particular columns of search memory 10 will result in the decrementing of columns of the counter bank which are one position to the left of said search memory columns. After the search memory field 10 is interrogated for letter y during cycle 51, columns 3, 4, 7, 8, and 9 of the counter bank have counted down to the final predetermined value of 0 in Table 4 notation. Each such column counter thus identifies a search memory column location which holds the first letter in each of the two-letter combinations for which the analysis is being made. The number of column counters having 0 values therein is also indicative of the total number of two-letter combinations, i.e., a total of five in Example 1. In practice, each column of the FIGURE 8 matrix that has been reduced by 2 counts during cycles 1–56 will have its row 4 element set to 1 so as to set a corresponding one of the flip-flops 470–479. At the conclusion of cycle 52, therefore, each of the flip-flops 472, 473, 476, 477 and 478 have been set to a 1 condition while the remaining flip-flops of this group are still in their 0 conditions. If now the step control 486 is energized, switch 482 successively samples each of the outputs of these ten flip-flops in order to transmit a pulse to the input of counter 484 each time that it comes upon a terminal connected to a flip-flop in the 1 condition. At the conclusion of the stepping sequence in FIGURE 18, counter 484 has received five counting pulses to thereby indicate the number of two-letter combinations in the X string for which analysis is made.

In a problem of this nature, where only one search memory field is interrogated during each cycle, the other search memory fields 12 and 14 can be loaded with different segments of a given string (whose total number of characters exceeds the number of columns in any particular search memory field) so that the above process can then be repeated first for the characters in field 12 and then for the characters in field 14. At the conclusion of these three processes, the values in the ZEROES counter represents the total number of diagraphs present in all of the search memory fields. The advantage of utilizing more than one search memory field to hold different segments of the same long character string lies in the fact that the time spent loading the search memory is reduced. The means by which the various members of the system are sequentially operated can be performed manually or by typical programming control circuitry if the system is part of a larger data processing complex.

*Example 2*

The problem of Example 2 is a modification of Example 1 in that it is desired to analyse the X string characters for only those two-letter combinations which begin at odd numbered positions, with spaces between the words of the string also counting as positions to be considered. Using the same X string of Example 1, i.e., "a boy came," Table 5 below shows the operation necessary to solve this problem.

matrix is interrogated, while at step (3) the selected columns of the counter bank are decremented.

Consider now the first cycle 1. For step (1) thereof, letter *a* is set on switches 90–94 and switch 107 of row 1 in the I field 14 is thrown to its binary 0 position. Actuating means 100 is then operated to simultaneously close contacts 95–99 and 117–121. Contacts 112–116 of the Y field are also closed, but since none of its switches 102–106 is moved from its center neutral position there is no interrogation of the Y field at this time. Since columns 2–7, 9 and 10 of the X string do not contain letter *a*, the associated sense output windings 78–83, 85, and 86 have induced thereon active signals for respectively setting the associated column elements 130 of the coincidence matrix to a binary 1 condition. Normally, sense output windings 77 and 84 would not have active signals induced therein because the character *a* is found in columns 1 and 8. However, the I field row 1 is now being interrogated for binary 0's in any of its elements. Since a binary 0 is stored in column 1 thereof, there is no E.M.F. induced on sense output winding 77 from the I field element 36 at this location. Thus, sense winding 155 remains entirely free of induced voltage from either the X field or the I field. However, column 8 of the I field contains a binary 1. This means that upon interrogation of its row 1 by binary 0 from switch 107, there is a reversal of flux in element 36 at this location so as to induce an active voltage output on winding 84 notwithstanding the fact that there is a letter *a* stored in column 8 of search memory field 10. Consequently, at the conclusion of step (1) of cycle 1, all of the elements 130 in row 1 of the coincidence matrix, except column 1, have stored therein a binary 1. This condition of the row 1 coincidence matrix elements should be compared with their condition during cycle 1 of Example 1 given above, wherein both the column 1 and column 8 elements were seen to be in binary 0 condition. For step (2) of cycle 1 in the instant problem, switch 180 is set to its binary 1 terminal so that inverter 192 interrogates row 1 of the coincidence matrix for binary 0 values. None of the other coincidence matrix rows 2–5 is at this time interrogated. Since all row 1

TABLE 5 (K=2)

| CYC | X | 11 | CM1 | CM2 | 1 | 2 | 3 | 4 | 5 | 6 | 7 | 8 | 9 | 10 |
|---|---|---|---|---|---|---|---|---|---|---|---|---|---|---|
|  |  |  |  |  | a | | b | o | y | | c | a | m | e (X) |
|  |  |  |  |  | 0 | 1 | 0 | 1 | 0 | 1 | 0 | 1 | 0 | 1 (I1) |
| 1 | a | 0 | 1 |   | 0 | 1 | 1 | 1 | 1 | 1 | 1 | 1 | 1 | 1 (CM1) |
|  |  |  |  |  | 1 | 2 | 2 | 2 | 2 | 2 | 2 | 2 | 2 | 2 (CB) |
| 2 | b | 0 | 1 |   | 1 | 1 | 0 | 1 | 1 | 1 | 1 | 1 | 1 | 1 (CM1) |
|  |  |  |  |  | 1 | 2 | 1 | 2 | 2 | 2 | 2 | 2 | 2 | 2 (CB) |
| 5 | e | 0 | 1 |   | 1 | 1 | 1 | 1 | 1 | 1 | 1 | 1 | 1 | 1 (CM1) |
|  |  |  |  |  | 1 | 2 | 1 | 2 | 2 | 2 | 1 | 2 | 2 | 2 (CB) |
| 26 | z | 0 | 1 |   | 1 | 1 | 1 | 1 | 0 | 1 | 1 | 1 | 1 | 1 (CM1) |
|  |  |  |  |  | 1 | 2 | 1 | 2 | 1 | 2 | 1 | 2 | 1 | 2 (CB) |
| 27 | a | 1 |   | 1 |   | 1 | 1 | 1 | 1 | 1 | 1 | 0 | 1 | 1 (CM2) |
|  |  |  |  |  | 1 | 2 | 1 | 2 | 1 | 0 | 0 | 2 | 1 | 2 (CB) |
| 52 | z | 1 |   | 1 |   | 1 | 1 | 1 | 1 | 1 | 1 | 1 | 1 | 1 (CM2) |
|  |  |  |  |  | 1 | 2 | 0 | 2 | 1 | 2 | 0 | 2 | 0 | 2 (CB) |

For this problem, one of the I field 14 rows, for example row 1 is loaded with a string of bits 0101010101 such that 0 bits lie in odd numbered I field columns while 1 bits lie in even numbered I field columns. Table 5 further shows that the X string characters are loaded into search memory field 10 in the same locations as was done for Example 1. It will therefore be seen that the only two-letter combinations to be counted in this problem are the following: "bo" (from boy), "ca" (from came), and "me" (from came). K=2 is entered into the counter bank and there are again 52 sequential comparison cycles, each comprised of the steps (1), (2), and (3) generally described above. At step (1) of each cycle a different letter of the alphabet is applied to search memory field 10 and row 1 of the I field is interrogated. At step (2) either row 1 or row 2 of the coincidence elements of the matrix except column 1 have a binary 1 stored therein, the reversal of flux induces output signals on sense windings 166–174. These signals in turn set flip-flops 442–450 back to the 0 condition leaving only flip flop 441 in its 1 condition. At step (3) of cycle 1 only column 1 of the counter bank will therefore be decremented.

Letters *b–z* of the English alphabet are respectively applied to search memory field 10 at step (1) of cycles 2–26. Also applied at step (1) in a binary 0 value to row 1 of the I search field 14. This means that even though character finds are made in field 10 with the X reference character, said find is only registered as a binary 0 value in the coincidence matrix if it is at an odd numbered column of the search memory. For each of the cycles 2–26, row 1 of the coincidence matrix is interrogated for a set value of 1 (true value of 0) at step (2) while at step (3) the counter bank is operated to decrement only odd numbered columns in which a character find was made during step (1). From Table 5 it will therefore be observed that at the conclusion of cycle 26, only the odd column counters have been decremented, whereas all even numbered counters still contain the initial value of 2 placed therein prior to cycle 1. This should be contrasted with the count standing in the counter columns at the end of cycle 26 of Example 1 above.

For cycles 27-52, a different letter of the alphabet is once again applied at step (1). Also applied at step (1) is a binary 1 to row 1 of the field, rather than the binary 0 value applied during cycles 1-26. The purpose of this change in the interrogating bit for the I field is that the second letter of a combination must obviously be in an even numbered position if the first letter thereof is in an odd numbered position. Therefore, it will be observed that null outputs appear on sense windings 155-164 only if character finds are made in even numbered columns. An example of this is shown in cycle 27 where letter *a* is found in search memory column 8 so that the coincidence matrix elements in column 8 remain in the binary 0 condition. At cycle 28 the letter *b* is found in column 3 but due to the fact that a binary 0 value is in column 3 of the I field, there is an output signal induced on winding 79 which prevents the coincidence matrix column 3 elements from remaining in their binary 0 state. At step (2) of each cycle 27-52 the coincidence matrix row 2 is interrogated, rather than row 1 by throwing switch 181 to its positive (binary 1) position so that inverter 193 interrogates for binary 0's in the row 2 elements. In step (3) only those counter bank columns one position to the left of those even columns in which character finds are made will be decremented. However, switch 523 in FIGURE 5 should be open during cycles 26-52 in order that the column 10 counter will not be selected in response to a null signal indication on sense winding 174.

An illustration of this process is the operation during cycle 27. When letter *a* is applied to search memory field 10, along with a binary 1 applied to row 1 of the I field, it is seen that only output sense winding 84 of the search memory has a null output thereon. All column elements of the FIGURE 5 coincidence matrix are set to binary 1 except those in column 8. Thus, when row 2 of the coincidence matrix is interrogated at step (2) of cycle 27, output sense windings 165-170, 172, and 173 will have signals induced thereon so as to reset respective flip-flops 441-446, 448 and 449 to a binary 0 condition. Only flip-flops 447 and 450 remain in a 1 condition. However, since switch 523 is now open, only flip-flop 447 is effective to permit the decrementing of the column 7 counter. In like manner the column 9 counter is decremented during cycle 31 because letter *e* is found in column 10 of search memory field 10, and the column 3 counter is decremented in cycle 41 because an *o* is found in column 4 of field 10. Thus, at the conclusion of cycle 52, it is seen that each of column counters 3, 7, and 9 has been decremented to its final predetermined 0 value thereby indicating that there are three two-letter combinations to be found in the X string each beginning at an odd position thereof. If the step control in FIGURE 18 is now actuated, 3 pulses will be successively applied to counter 484.

If the problem of Example 2 is altered slightly to count only the two-letter combinations beginning at even column positions, the procedure is the same as described above except that during cycles 1-26 row 1 of the I field is interrogated for binary 1 rather than for binary 0, and during cycles 26-52 said row 1 is interrogated for binary 0 rather than binary 1. At the conclusion of cycle 52 column counters 4 and 8 in FIGURE 8 should contain the predetermined 0 value thus indicating that there are two such letter combinations beginning at even positions. These two combinations are "*oy*" in columns 4 and 5, and "*am*" in columns 8 and 9.

Although the I field is shown to be interrogated simultaneously with the X field during step (1), each may be sampled in sequence during this step for an alternative but slower mode of operation. This is permissible because of the novel use and interconnection of the thin film search memories wherein a null output on a search memory sense winding is significant of a character find. Thus, a change in flux of any search memory element of a column can act independently of the flux change in any other element of the column to thereby set a coincidence matrix column and so indicate the absence of a character find in the X field, I field or both.

*Example 3*

The problem illustrated by this example is somewhat similar to Examples 1 and 2 except that a count must be made of the occurrences of all digraph combinations repeated in the same string after an interval of three characters. For example, assume that the characters in the X string are the English words "this is it" stored in search memory field 10 so that the word "this" is found in columns 1-4; "is" found in columns 6 and 7; and "it" is found in columns 9 and 10. Characters specifying spaces may be inserted in columns 5 and 8. Table 6 illustrates this arrangement.

TABLE 6 (K=2)

| CYC | X | CM1 | CM2 | CM4 | CM5 | 1 | 2 | 3 | 4 | 5 | 6 | 7 | 8 | 9 | 10 | |
|---|---|---|---|---|---|---|---|---|---|---|---|---|---|---|---|---|
| 1 | a | 1 | | 1 | | t 1 | h 1 | i 1 | s 1 | | i 1 | s 1 | | i 1 | t 1 | (CM1) |
| | | | | | | | | | | 1 | 1 | 1 | 1 | 1 | 1 | (CM4) |
| | | | | | | 2 | 2 | 2 | 2 | 2 | 2 | 2 | 2 | 2 | 2 | (CB) |
| 8 | h | 1 | | 1 | | 1 | 0 | 1 | 1 | 1 | 1 | 1 | 1 | 1 | 1 | (CM1) |
| | | | | | | | | | 1 | 1 | 1 | 1 | 1 | 1 | 1 | (CM4) |
| | | | | | | 2 | 2 | 2 | 2 | 2 | 2 | 2 | 2 | 2 | 2 | (CB) |
| 9 | i | 1 | | 1 | | 1 | 1 | 0 | 1 | 1 | 0 | 1 | 1 | 0 | 1 | (CM1) |
| | | | | | | | | | 1 | 1 | 0 | 1 | 1 | 0 | 1 | (CM4) |
| | | | | | | 2 | 2 | 1 | 2 | 2 | 1 | 2 | 2 | 2 | 2 | (CB) |
| 19 | s | 1 | | 1 | | 1 | 1 | 1 | 0 | 1 | 1 | 0 | 1 | 1 | 1 | (CM1) |
| | | | | | | | | | 0 | 1 | 1 | 0 | 1 | 1 | 1 | (CM4) |
| | | | | | | 2 | 2 | 1 | 1 | 2 | 1 | 2 | 2 | 2 | 2 | (CB) |
| 35 | i | | 1 | | 1 | | 1 | 0 | 1 | 1 | 0 | 1 | 1 | 0 | 1 | (CM2) |
| | | | | | | | | | | 1 | 0 | 1 | 1 | 0 | 1 | (CM5) |
| | | | | | | 2 | 1 | 1 | 1 | 1 | 2 | 2 | 2 | 2 | (CB) |
| 45 | s | | 1 | | 1 | | 1 | 1 | 0 | 1 | 1 | 0 | 1 | 1 | 1 | (CM2) |
| | | | | | | | | | | 1 | 1 | 0 | 1 | 1 | 1 | (CM5) |
| | | | | | | 2 | 1 | 0 | 1 | 1 | 1 | 2 | 2 | 2 | 2 | (CB) |

Considering now the first character combination of "th" found in columns 4 and 5 which are three character spaces away from the corresponding "hi" in columns 2 and 3 is not repeated in columns 5 and 6. However, the third two-letter combination "is" in columns 3 and 4 is repeated at an interval of three characters by "is" in columns 6 and 7. Thus, here is one occurrence of a two-letter combination repeated in the same string after an interval of three characters. The fourth digraph combination is "is" in columns 6 and 7. Although the letter *i* in column 9 is three character spaces away from letter *i* in column 6, column 10 contains letter *t* rather than a letter *s* which is held in column 7. Consequently, the combination "is" in columns 6 and 7 is not repeated in columns 9 and 10. An analysis of thin character string therefore reveals only one occurrence of a repeated two-letter combination at an interval of three character spaces.

The counter bank 26 is set to an initial count of $K=2$, then 52 numbered comparison cycles are performed, each comprised of steps (1), (2) and (3) in that sequence. At step (1) for each of the cycles 1–26, a different English letter is applied to search memory field 10. At step (2) of each of the cycles 1–26, both row 1 and row 4 of the coincidence matrix are interrogated with 1 bits set up on switches 180 and 183, and at step (3) the counter bank is operated to decrement any of the columns whose flip-flops have remained set by the finding of coincidence in the coincidence matrix. However, when the coincidence matrix of FIGURE 5 is employed, switches 521, 522, and 523 are left open for each cycle 1–26 in order to prevent false counting. If the matrix of FIGURE 5A is used instead, then switches 558, 559, and 560 are temporarily closed prior to each interrogation of the coincidence matrix so that active signals are always induced on sense windings 172, 173, and 174 whenever winding 153 is driven. During each of the cycles 27–52, a different letter of the English alphabet is once again applied to search memory field 10, but at step (2) thereof rows 2 and 5 of the coincidence memory are now interrogated for binary 1 bits set up on switches 181 and 184. Also during cycles 27–52, switches 520, 521, 522, and 523 of FIGURES 5 are now left open to prevent false counting. If FIGURE 5A is being used, then switches 558–561 are temporarily closed prior to each row 5 interrogation. At step (3) of these cycles 27–52 the counter bank is once again operated.

Consider cycle 1 wherein letter *a* is used to interrogate the search memory field 10. Since no search memory column contains this letter, all output sense windings 77–86 have voltages induced thereon at the time contacts 95–99 are closed. Consequently, all of the coincidence matrix elements 130 in columns 1–10 are set to binary 1 during step (1). Table 6 shows only the contents of elements 130 in rows 1 and 4 since interrogation is limited to these during cycles 1–26. At step (2) switches 180 and 183 are set to binary 1 such that inverters 192 and 195 simultaneously interrogate their respective rows 1 and 4 for the presence of binary 0's therein. Since all elements 130 in each of these two rows have binary 1's stored therein, flux reversal occurs in each during step (2) so as to induce a voltage on each of the matrix sense windings 165–174 thus returning all of the flip-flops 441–450 to their 0 condition. It is to be noted that although the selected two rows of the coincidence matrix are herein described as being simultaneously interrogated during step (2) in order to obtain the fastest possible system speed, they may obviously be sequentially driven without impairing the logical operation of the system. During the decrementing step (3) no column flip-flop in FIGURE 8 is set to condition 1 thereby preventing a change in the value of any column. This situation is shown in Table 6 since all of the column counters retain their initial inserted value of decimal 2.

If the letters of the alphabet are applied in order, it will not be until cycle 8 that the search memory contains a letter for which interrogation is made. This letter is *h* found in column 2 of search memory field 10. Consequently, in row 1 of the coincidence matrix the column 2 element 130 remains in its binary 0 status at the conclusion of step (1). Row 4 of the coincidence matrix contains no elements 130 in any of the columns 1, 2, or 3. In step (2) of cycle 8 rows 1 and 4 of the coincidence matrix are simultaneously interrogated for 0's by binary 1's set on switches 180 and 183. Both the column 1 element of row 1, and the column 4 element of row 4 have binary 1's stored therein either of which, when interrogated, induces an output signal on sense winding 165. The column 2 element of row 1 has a binary 0 stored therein which will not be disturbed upon the interrogation of that row. Hence, it induces no voltage on sense winding 166. The column 5 element of row 4, however, has a binary 1 stored therein which, upon reversal, induces a signal on sense winding 166 thus indicating that at least one noncoincidence has been found in an interrogated core inductively coupled therewith. All other sense windings of the coincidence matrix also have signals generated thereupon. Consequently, because all of the flip-flops 441 through 450 are returned to a 0 condition at the conclusion of step (2) of cycle 8, there will be no decrementing of any column in the counter bank during step (3).

During cycle 9, letter *i* is applied to the search memory and finds like characters in columns 3, 6, and 9 thereof. In row 1 of the coincidence matrix the elements in corresponding columns 3, 6, and 9 are therefore left in their binary 0 state, while in row 4 the column 6 and column 9 elements are also left in their binary 0 condition. At step (2) of cycle 9, rows 1 and 4 are interrogated as above. Voltages are induced on sense windings 165 and 166 because at least one interrogated core associated with each has a binary 1 stored therein at the time that the inverters interrogate rows 1 and 4 for binary 0's. It will be observed, however, that sense winding 167 has no voltage induced thereon during step (2) because both the column 3 element of row 1 and the column 6 element of row 4 have binary 0 values stored therein which are not reversed by the currents flowing in the respective interrogate windings 150 and 153. This means that flip-flop 443 remains in its binary 1 condition where it was placed preceding interrogation of the coincidence matrix. Output sense winding 170 of the coincidence matrix also does not have voltage induced thereon because the column 6 element of row 1 and the column 9 element of row 4 (the only rows interrogated) both contain binary 0 values. Output sense winding 173 of FIGURE 5 likewise has a null output due to the fact that its only interrogated element is that in column 9 of row 1 which contains a binary 0 value. However, this null output on sense winding 173 should not be interpreted as authorizing the decrementing of column 9 in the counter bank, since it is a false signal in that it does not actually mean that there are identical characters separated by three character positions. At the end of step (2) in cycle 9, only flip-flops 443, 446, and 449 are left in their 1 condition. Since switches 521, 522, and 523 are open, however, the 1 state of flip-flop 449 is not able to prepare counting column 9 for decrementing. Hence, only column 3 and column 6 of the counter bank are decremented during step (3).

For cycles 10–18, there will be no change in the values standing in the counter bank due to the fact that the letters interrogated for are not found to be repeated three character positions away from one another. However, during cycle 19, letter *s* is applied to the search memory field 10 in which resides the identical letter in both columns 4 and 7 thereof. This means that during step (2) only sense winding 168 of the coincidence matrix will have a valid null output due to the fact that both the column 4 element of row 1 and the column 7 element of row 4 have binary 0 values. During step (3) of cycle 19, only column 4 of the counter bank will therefore have a value of 1 subtracted from its initial count.

Although the interrogation of the X string by letter *t* during cycle 20 finds a like character in columns 1 and 10, the fact that said letter *t* is not repeated three characters away prevents any more of the columns in the counter bank from being decremented. For cycles 21–26, wherein letters *u–z* are applied to the search memory, there will be no character finds so that cycle 26 ends with only three columns of the counter matrix having been decremented. Beginning with cycle 27, the letters of the English alphabet are re-applied to the X string, but at step (2) of each said cycle rows 2 and 5 of the coincidence matrix are instead interrogated and switches 520–523 are left open to prevent any of the column counters 7–10 from being decremented during step (3). To illustrate the above, letter $a$ is applied during cycle 27 to the X string without finding a like character therein. Therefore, all coincidence matrix elements 130 are set to binary 1. During step (2) of cycle 27 switches 181 and 184 are thrown to represent binary 1, with rows 2 and 5 of the matrix therefore being interrogated for binary 0. All flip-flops 441 through 450 are reset to 0 thereby preventing counter decrementation at step (3) of cycle 27. It is actually not until cycle 35 that a decrementing occurs in the counter bank. For this cycle the letter $i$ is once again applied to search memory 10 and finds identical characters in columns 3, 6, and 9 thereof. In row 2 of the coincidence matrix the column 3, 6, and 9 elements are therefore in their 0 condition, while in row 5 the column 6 and 9 elements are likewise at 0. At step (2) in cycle 35 it will be observed that only output sense windings 166 and 169 have valid null outputs at the time that rows 2 and 5 are interrogated. These sense windings are respectively associated with counting columns 2 and 5 rather than with columns 3 and 6 as was the case for sense windings 167 and 170 during cycle 9. At step (3) of cycle 35, each of the counting columns 2 and 5 is therefore decremented by 1 to result in counter bank values such as shown in Table 6.

Until cycle 45 is initiated, there will be no more values subtracted from the counter bank. During cycle 45, the letter $s$ is applied to the search memory and finds like comparisons in columns 4 and 7 thereof. These comparisons leave the column 4 and 7 elements of the coincidence matrix in their 0 state. At step (2), sense winding 167 fails to have a voltage induced thereon because neither of its interrogated cores is reversed. This means that column 3 of the counter bank is decremented by 1 during step (3) of cycle 45, leaving it with a count of 0 in the terminology of Table 6. The appearance of 0 indicates that column 3 contains the first character of a two-letter sequence which repeats itself three character positions later. At the conclusion of cycle 52, the column 3 counter is the only one to have arrived at this predetermined final count. Thus, when a step control 486 in FIGURE 18 is subsequently initiated, only one counting pulse is added to counter 484.

*Example 4*

A problem is now given wherein both the search memory fields 10 and 12 are interrogated in step (1) of each comparison cycle. Assume that the X string consists of the words "cat jumped" while the Y string consists of the words "dog ran in." It is desired to count the exact coincidences of "cat" in the X string with "dog" in the Y string. The X and Y strings are stored in respective search memory fields 10 and 12 in the column locations indicated in Table 7 below. A coincidence between words of different strings only occurs where said words appear in the same corresponding column locations. From Table 7 it will be evident that there is only one such coincidence in this example.

problem. Prior to cycle 1, an initial value of $K=3$ is placed into each column of the counter bank so that each requires three decrementing steps in order for it to arrive at the final predetermined 0 value which can be identified by the ZEROES counter. In practice, if the counting matrix of FIGURE 8 is used, it is necessary to insert decimal value 2 into each of the columns since an overflow indication is not indicated until the count goes from 000 to 111 as has been previously described.

During step (1) of cycle 1, the X string is interrogated for letter $c$ while the Y string is interrogated for the letter $d$. Although these interrogations may be sequentially performed during this step, a faster way is to carry them out simultaneously. This means that switches 90–94 are set to the code representing letter $c$ for search field 10, while switches 102–106 are set to the code representing letter $d$ for search memory field 12. The I field 14 is not interrogated in this example. When contacts 95–99 and 112–121 are subsequently closed, it will be observed that a null output appears only when correspondingly columns of the two interrogated fields contain the characters for which interrogation is performed. Hence, since column 1 of field 10 stores $c$, for which interrogation is made, and column 1 of field 12 stores $d$, for which interrogation is made, output sense winding 77 has no voltage induced thereon thus indicating agreement between the reference characters and the stored characters in column 1. All other output sense windings 78 through 86 have active voltages induced thereon because of the absence of one or more of the letters for which interrogation is made. Consequently, all column 1 elements of the coincidence matrix remain in a 0 state, whereas all elements 130 in the other columns 2–10 are switched to binary 1. Switches 520–523 in FIGURE 5 are all closed and at step (2) of cycle 1, only row 1 of the coincidence matrix is interrogated for binary 0 by setting switch 180 to binary 1. All sense output windings from the coincidence matrix, except for winding 165, will therefore have voltages induced thereon. This means that at step (3) of cycle 1, only column 1 of FIGURE 8 is decremented thus leaving a value of 2 therein.

During cycle 2, the X string is searched for letter $a$ while the Y string is searched for letter $o$. These two letters are found in their respective fields within the same corresponding column 2. Consequently, only sense output winding 78 of the search memory fails to have voltage induced thereon, thereby leaving the column 2 elements of the coincidence matrix in their 0 condition. At step (2) of cycle 2, only row 2 of the coincidence matrix is interrogated by setting switch 181 to binary 1 which, when inverted by I 193, causes row 2 to be searched for binary 0. Column 3–10 elements of row 2 all contain binary 1's which, when reversed, render signals on output sense windings 166 to 173. The column 2 element of row 2, on the other hand, contains a binary 0 value which is undisturbed by the current flowing in interrogate winding 151. Consequently, sense winding 165 does not have voltage induced thereon. Sense winding 174 also fails to have a voltage induced

TABLE 7 (K=3)

| CYC | X | Y | CM1 | CM2 | CM3 | 1 | 2 | 3 | 4 | 5 | 6 | 7 | 8 | 9 | 10 | |
|---|---|---|---|---|---|---|---|---|---|---|---|---|---|---|---|---|
| | | | | | | c | a | t | | j | u | m | p | e | d | (X) |
| | | | | | | d | o | g | | r | a | n | | i | n | (Y) |
| 1 | c | d | 1 | | | 0 | 1 | 1 | 1 | 1 | 1 | 1 | 1 | 1 | 1 | (CM1) |
| | | | | | | 2 | 3 | 3 | 3 | 3 | 3 | 3 | 3 | 3 | 3 | (CB) |
| 2 | a | o | | 1 | | | 0 | 1 | 1 | 1 | 1 | 1 | 1 | 1 | 1 | (CM2) |
| | | | | | | 1 | 3 | 3 | 3 | 3 | 3 | 3 | 3 | 3 | 3 | (CB) |
| 3 | t | g | | | 1 | | | 0 | 1 | 1 | 1 | 1 | 1 | 1 | 1 | (CM3) |
| | | | | | | 0 | 3 | 3 | 3 | 3 | 3 | 3 | 3 | 3 | 3 | (CB) |

Three comparison cycles, each comprising steps (1), (2), and (3), are performed in order to solve this thereon, but if switch 523 of FIGURE 5 is open during cycle 2, column 10 of the counter bank ignores this null output on sense winding 174. At step (3) of cycle 2, it will therefore be appreciated that column 1 of the counter bank will again be decremented. At the end of cycle 2, column 1 of the counter bank now contains value 1 after having been decremented twice, while all other column counters retain their original inserted value of 3.

During cycle 3, letter *t* is applied to search memory field 10 while letter *g* is applied to search memory field 12. These letters are found in their respective fields at corresponding column 3. All column 3 elements of the coincidence matrix are therefore left standing at binary 0. At step (2) only row 3 of the coincidence matrix is interrogated with a binary 1 set on switch 182. Sense winding 165 again has a null output therefrom indicating that each interrogated core coupled therewith is in its binary 0 condition. Other sense windings 166–172 have voltages induced thereon because of flux reversal in their row 3 elements. Although windings 173 and 174 also have null outputs at this time, these are not valid signals inasmuch as neither winding has a row 3 element which is being interrogated. The counter bank can be made to ignore these false null signals by opening switches 522 and 523 in FIGURE 5. If FIGURE 5A is used instead, then switches 558 and 559 are temporarily closed prior to the interrogation of the coincidence matrix so that active signals are induced on sense windings 173 and 174 when row 3 is driven. Since sense winding 165 will cause the column 1 flip-flop of the counter bank to be set to a 1 condition, said column is again decremented at step (3) of cycle 3. Therefore, it is seen that a predetermined final count of 0 is contained only in column 1 of the counter bank at the conclusion of cycle 3, thus 5 of these fields such that column 5 of the counting bank is decremented by 1. Letter *d* is also found in column 1 of the Y string, but since a letter other than *c* is located in column 1 of the X string there is no decrementing of the counter bank column 1. For cycle 2, the X string is scanned for letter *a* and the Y string for letter *o*. These two letters appear in their respective strings in corresponding columns 2 thereof such that column 1 of the counting bank is decremented by 1 during step (3) of cycle 2. During cycle 3 the letter *t* is applied to the X string and letter *g* is applied to the Y string, both of which are found in columns 3 of their respective fields. Since the coincidence matrix row 3 is interrogated during cycle 3, this means that the column 1 counter is again decremented during this last cycle. However, for the three cycles the column 1 counter has only been decremented twice since the letters *c* and *d* were not both found in column 1 during cycle 1. At the conclusion of cycle 3, therefore, Table 8 shows that none of the column counters has a 0 value remaining therein. The system therefore reflects the fact that there has been no perfect coincidence of "cat" with "dog" as was the case shown in Table 7.

*Example 5*

This last example is given to illustrate a potential use of the character correlation system wherein it is desired to count the occurrences of a vowel in the X string followed four characters later in the Y string by any letter not a vowel. Assume, for example, that the X string consists of the words "a boy came" while the Y string consists of the words "see over" as shown in Table 9 below.

TABLE 9 (K=6)

| CYC | X | Y | CM1 | CM5 | 1 | 2 | 3 | 4 | 5 | 6 | 7 | 8 | 9 | 10 | |
|---|---|---|---|---|---|---|---|---|---|---|---|---|---|---|---|
|  |  |  |  |  | a | | b | o | y | | c | a | m | e | (X) |
|  |  |  |  |  | s | e | e | | o | v | e | r | | | (Y) |
| 1 | a | | 1 | | 0 | 1 | 1 | 1 | 1 | 1 | 1 | 0 | 1 | 1 | (CM1) |
|  |  |  |  |  | 5 | 6 | 6 | 6 | 6 | 6 | 6 | 5 | 6 | 6 | (CB) |
| 2 | e | | 1 | | 1 | 1 | 1 | 1 | 1 | 1 | 1 | 1 | 1 | 0 | (CM1) |
|  |  |  |  |  | 5 | 6 | 6 | 6 | 6 | 6 | 6 | 5 | 6 | 5 | (CB) |
| 3 | i | | 1 | | 1 | 1 | 1 | 1 | 1 | 1 | 1 | 1 | 1 | 1 | (CM1) |
|  |  |  |  |  | 5 | 6 | 6 | 6 | 6 | 6 | 6 | 5 | 6 | 5 | (CB) |
| 4 | o | | 1 | | 1 | 1 | 1 | 0 | 1 | 1 | 1 | 1 | 1 | 1 | (CM1) |
|  |  |  |  |  | 5 | 6 | 6 | 5 | 6 | 6 | 6 | 5 | 6 | 5 | (CB) |
| 5 | u | | 1 | | 1 | 1 | 1 | 1 | 1 | 1 | 1 | 1 | 1 | 1 | (CM1) |
|  |  |  |  |  | 5 | 6 | 6 | 5 | 6 | 6 | 6 | 5 | 6 | 5 | (CB) |
| 6 | | a | | 0 | | | | | 1 | 1 | 1 | 1 | 1 | 1 | (CN5) |
|  |  |  |  |  | 4 | 5 | 5 | 4 | 5 | 5 | 6 | 5 | 6 | 5 | (CB) |
| 7 | | e | | 0 | | | | | 1 | 1 | 0 | 1 | 1 | 1 | (CM5) |
|  |  |  |  |  | 3 | 4 | 5 | 3 | 4 | 4 | 6 | 5 | 6 | 5 | (CB) |
| 8 | i | | | 0 | | | | | 1 | 1 | 1 | 1 | 1 | 1 | (CM5) |
|  |  |  |  |  | 2 | 3 | 4 | 2 | 3 | 3 | 6 | 5 | 6 | 5 | (CB) |
| 9 | o | | | 0 | | | | | 0 | 1 | 1 | 1 | 1 | 1 | (CM5) |
|  |  |  |  |  | 2 | 2 | 3 | 1 | 2 | 2 | 6 | 5 | 6 | 5 | (CB) |
| 10 | u | | | 0 | | | | | 1 | 1 | 1 | 1 | 1 | 1 | (CM5) |
|  |  |  |  |  | 1 | 1 | 2 | 0 | 1 | 1 | 6 | 5 | 6 | 5 | (CB) | indicating that there is only one occurrence of the desired "cat"-"dog" coincidence.

Table 8 below indicates the system operation when the words "cat" and "dog" are found in the respective X and Y strings but in different column positions thereof. Assume that the X string placed into search memory field 10 is comprised of the words "fat cattle," while the Y string placed into search memory field 12 is comprised of the words "dog days."

Since the relationship for which analysis is to be made involves a 4-character spacing, the problem becomes that of comparing the character in each column of the X string with a character in a Y string column which is four spaces away to the right of the X string column. That is to say, the character in column 1 of the X string is compared with the character in column 5 of the Y string; column 2 of the X string with column 6 of the Y string; column 3 of the X string with column 7 of

TABLE 8 (K=3)

| CYC | X | Y | CM1 | CM2 | CM3 | 1 | 2 | 3 | 4 | 5 | 6 | 7 | 8 | 9 | 10 | |
|---|---|---|---|---|---|---|---|---|---|---|---|---|---|---|---|---|
|  |  |  |  |  |  | f | a | t | | c | a | t | t | l | e | (X) |
|  |  |  |  |  |  | d | o | g | | d | a | y | s | | | (Y) |
| 1 | c | d | 1 | | | 1 | 1 | 1 | 1 | 0 | 1 | 1 | 1 | 1 | 1 | (CB) |
|  |  |  |  |  |  | 3 | 3 | 3 | 3 | 2 | 3 | 3 | 3 | 3 | 3 | (CB) |
| 2 | a | o | | 1 | | | 0 | 1 | 1 | 1 | 1 | 1 | 1 | 1 | 1 | (CM2) |
|  |  |  |  |  |  | 2 | 3 | 3 | 3 | 2 | 3 | 3 | 3 | 3 | 3 | (CB) |
| 3 | t | g | | | 1 | | | 0 | 1 | 1 | 1 | 1 | 1 | 1 | 1 | (CM3) |
|  |  |  |  |  |  | 1 | 3 | 3 | 3 | 2 | 3 | 3 | 3 | 3 | 3 | (CB) |

During cycle 1, the X string is interrogated for letter *c* while the Y string is interrogated for letter *d*. A coincidence of *c* and *d* is found in corresponding columns the Y string; etc. Thus, it is seen that X string vowel *a* in column 1 is followed by the Y string vowel *o* in column 5. X string vowel *o* in column 4 is followed four characters later by Y string consonant *r* in column 8. X string vowel *a* in column 8 cannot be the basis of a comparison with a Y string character since only two Y string characters follow the column 8 location of the X string vowel. Hence, there will be only one occurrence of a vowel (*o* in column 4) in the X string followed four characters later by any character not a vowel (*r* in column 8) in the Y string.

There are several different ways in which the character correlation system may be operated to solve the problem of this example. The preferred method resulting in the shortest possible analysis time, is illustrated in Table 9. This method requires ten comparison cycles each comprised of steps (1), (2), and (3) in that order. Prior to cycle 1, each column of the counter bank is set to a decimal value $K=6$ such that six decrementing operations are required to reduce the value in any counter to a final predetermined value of 0. Actually, as has heretofore been explained, the counter matrix of FIGURE 8 would require that decimal value 5(101) be inserted therein so that six decrementing operations would reduce the count to 111 at which time the row 4 element is switched. For the first five cycles, a different vowel of the English alphabet is looked for in the X string only, with only row 1 of the coincidence matrix being interrogated at step (2) of each cycle. For cycles 6 to 10, a different vowel of the English alphabet is looked for in only the Y string, with only row 5 of the coincidence matrix being interrogated during step (2).

Consider now cycle 1 wherein vowel *a* is set on switches 90–94 for interrogation of search memory field 10. Character *a* is found in both columns 1 and 8 of search memory field 10 so as to cause the elements in corresponding columns 1 and 8 of the coincidence matrix to remain in the 0 condition. At step (2) of cycle 1, row 1 of the coincidence matrix is interrogated by a 1 bit value set on switch 180, which when inverted by 192, causes the current in winding 150 to interrogate for binary 0 values. These 0 values are found only in the column 1 and column 8 elements of this row so as to permit the decrementing of counter bank columns 1 and 8 at step (3) of this cycle. During step (1) of cycle 2, the X string is interrogated for letter *e* which is found only in column 10 thereof. Row 1 is again interrogated during step (2) and results in counting column 10 being decremented during step (3) of the cycle. Hence, at the conclusion of cycle 2, the column counters 1, 8, and 10 have been once decremented.

During cycle 3, the X string is interrogated for vowel *i*. Since none is contained in the X string, there will not be any counter operation during step (3) of this cycle. The vowel *o* is used to interrogate the X string during cycle 4, and the finding of an *o* in column 4 causes column 4 of the counter bank to be decremented by 1. Vowel *u* is interrogated for during cycle 5 but since there is none present, there is no change in the counter bank. At the conclusion of cycle 5 there is then decimal 5 contained in columns 1, 4, 8, and 10 of the counter bank, but other columns thereof still contain the original inserted value of 6. Again, it is to be understood that the use of a counting matrix such as shown in FIGURE 8 means that the actual count therein is one less than the values indicated in Table 9.

The purpose of cycles 1–5 is to determine the column location of all the vowels in the X string. The object of cycles 6–10 is to determine the column location of vowels in the Y string which are four character positions removed from the vowels in the X string. However, the detection of a Y string vowel should *not* be allowed to decrement a column in the counter bank because the relationship looked for is the occurrence of a Y string character not a vowel. Hence, row 5 of the coincidence matrix is interrogated during cycles 6–10 by a binary 0 placed upon switch 184 which, when inverted, searches for binary 1's in the row 5 elements. To illustrate this operation, consider cycle 6 wherein only the Y string is interrogated for the vowel *a*. Since *a* is not to be found in the Y string, all elements 130 of the coincidence matrix are set to binary 1. Row 5 of the matrix actually has no elements in columns 1–4, with this fact being indicated in Table 9 by the dashes in these column positions. At step (2) of cycle 6 an interrogation is now made of row 5 by setting switch 184 to binary 0 and then closing contacts 185–189. Current flows through interrogate winding 154 which actually looks for binary 1's in all of the row 5 elements. Since all elements actually do contain this value, there is no flux reversal in any of them which means that there is a null signal indication on all of the sense windings 165–170. Sense windings 171–174 also have null outputs which are not significant in this comparison due to the fact that these last four sense windings have no interrogated row 5 elements inductively coupled therewith. At the conclusion of step (2) in cycle 6, flip-flops 441–450 (FIGURE 5) remain in their binary 1 condition. To avoid false counting in columns 7–10 of the counter bank, switches 520–523 are left open during cycles 6–10. Therefore, only columns 1–6 are actually decremented by 1 during step (3) of cycle 6. Table 9 shows the value remaining in each of the counting matrix columns at the conclusion of cycle 6.

During cycle 7 the Y string is interrogated for vowel *e* which is found in columns 2, 3, and 7 thereof. The coincidence matrix row 5 therefore has only an element in column 7 which is left in its binary 0 condition. When row 5 is interrogated in step (2) of cycle 7, the flux in this column 7 element is reversed, thus inducing a voltage on output sense winding 167. The other output windings 165, 166, 168, 169, and 170 have null outputs therefrom so as to permit respective counter columns 1, 2, 4, 5, and 6 to be decremented at step (3) of cycle 7. Table 9 therefore shows that the values in column counters 1, 2, 4, 5, and 6 is one less than their values at the end of cycle 6, whereas the value in column 3 is identical to its value at the end of cycle 6.

Turning now to cycle 8, the Y string is interrogated for letter *i* at step (1) thereof. Since *i* is not to be found in the Y string, each of the column counters 1–6 is decremented during step (3) thereof. During cycle 9 the letter *o* is found in column 5 of the Y string so as to prevent column 1 of the counter bank from being decremented during step (3). Columns 2–6 however, are decremented at said step (3). During the final cycle 10, vowel *u* is supplied to the Y string but does not find a match therein. All of the column counters 1–6 will therefore be decremented during step (3) of cycle 10. At the conclusion of cycle 10, it will therefore be seen that only column counter 4 has the final predetermined value of 0. The reason for this 0 value is that the column 4 counter was decremented only once during the cycles 1–5, and then was decremented during each of the cycles 6–10. On the other hand, the column 1 counter was also decremented only once during cycles 1–5, but was not decremented during cycle 9 because the vowel *o* was found in column 5 of the Y string. Consequently, it is decremented one less time than column 4. Other column counters such as 2, 5, and 6 are also decremented for each of the cycles 6–10 but they were not decremented at all during cycles 1–5.

An alternative method of operating the system for this problem, but one that requires many more comparison cycles, is the following. Each of the counter columns is initially set to a decimal value 2 rather than decimal value 6 as in the preferred method. Cycles 1–5 of this alternative method are identical with cycles 1–5 of the preferred method. Consequently, at the conclusion of cycle 5, column counters 1, 4, 8, and 10 each will have been decremented by 1 so as to now contain decimal value 1. However, instead of interrogating the Y field for vowels as was done during cycles 6–10 of the preferred method, the procedure is now to interrogate the Y field for characters other than vowels and then interrogate row 5 of the coincidence matrix with the same actual value of 0 as was used for row 1 during cycles 1–5. Since there are many more nonvowel characters than vowel characters, it is seen that there would be a considerable increase in the number of cycles following cycle 5. At the conclusion of the process, however, only column 4 of the counter bank would be reduced to 0. From the above, it will thus be appreciated that a decrease in processing time for some problems can be gained by permitting the coincidence matrix rows to be actually interrogated for either a binary 1 or a binary 0 value. In effect, the coincidence matrix can thus be selectively employed to authorize counter decrementation (or incrementation) for either a search memory character find or a character nonfind. This increases the versatility of the entire system as is plainly shown by the two different methods employed in this example.

Throughout the preceding description of the structure and its operation, the counter bank 26 and ZEROES counter 30 of FIGURE 1 have been employed in novel fashion to provide a single statistical output from the system in terms of the total number of looked for character relationships found during a problem analysis. Where only information is desired as to the locations of specified character relationships, however, then the ZEROES counter may obviously be eliminated, or replaced by other utilization means. Furthermore, it should be observed that if the initial counter value is known to a human operator, for example, then the final value standing in each counter of the bank at the conclusion of the operation would by itself be able to communicate the results of the analysis to said operator. It would also be possible in practice, if the system were manually operated rather than by high speed automatic electronic control circuits, to provide human observable manifestations of the null or active signal indications appearing on the sense windings of the coincidence matrix so as to eliminate the need for mechanized counting or similar means connected to the coincidence matrix outputs. Therefore, although preferred embodiments of the system have been shown and described, various modifications may be made thereto by those skilled in the art without departing from the novel principles defined in the appended claims.

The embodiments of the invention in which an exclusive property or privilege is claimed are defined as follows:

1. A character correlation system comprising:
  (a) a search memory field adapted to hold a string of characters at different spatially related locations thereof;
  (b) first means for simultaneously interrogating all of said search memory field locations for the presence therein of any particular character;
  (c) second means operatively connected with said search memory locations and responsive to the interrogation thereof which can generate spatially related first signal indications each signifying that said particular character interrogated for is present in a particular different spatial search memory location;
  (d) third means for generating spatially related reference signals whose total number and spatial relationship can be selectively varied;
  (e) fourth means for comparing said reference signals simultaneously with each of several different spatially shifted positions of said first signal indications, wherein spatially related second signal indications can be generated each identifying a particular different spatially shifted position of said first signal indications which permits coincidence therewith of said reference signals; and
  (f) a plurality of fifth means each individually determining the number of times that a particular second signal indication is generated.

2. A system according to claim 1 wherein each fifth means is adapted to signify when its respective second signal indication has been generated a predetermined number of times.

3. The system according to claim 2 wherein is further included sixth means for specifying the total number of said fifth means that in turn have signified that their respective second signal indications have been generated said predetermined number of times.

4. A character correlation system comprising:
  (a) a plurality of search memory fields each adapted to hold a string of characters therein at different spatially related locations thereof, with each different location in any search memory field spatially corresponding to one location in each of the other search memory fields;
  (b) a plurality of first means each for simultaneously interrogating all of the locations of a respective different search memory field for the presence therein of any particular character;
  (c) second means operatively connected with spatially corresponding locations in all of said search memory fields and responsive to interrogations thereof which can generate spatially related first signal indications each signifying that said particular characters interrogated for in every respective search memory field are present in particular different corresponding spatial locations thereof;
  (d) third means for selectively generating spatially related reference signals whose total number and spatial relationship can be selectively varied;
  (e) fourth means for comparing said reference signals simultaneously with each of several different spatially shifted positions of said first signal indications, wherein spatially related second signal indications can be generated each identifying a particular different spatially shifted position of said first signal indications which permits coincidence therewith of said reference signals; and
  (f) a plurality of fifth means each individually determining the number of times that a particular different second signal indication is generated.

5. A system according to claim 4 wherein each fifth means is adapted to signify when its respective second signal indication has been generated a predetermined number of times.

6. A system according to claim 5 wherein is further included a sixth means for specifying the total number of said fifth means that in turn have signified that their respective second signal indications have been generated said predetermined number of times.

7. A system according to claim 4 wherein said plurality of first means are adapted to interrogate their respective search memory fields at the same time.

8. A system according to claim 4 wherein at least one of said search memory fields is adapted to hold characters each represented in a multi-bit code, and at least another of said search memory fields is adapted to hold characters each represented in a single bit code.

9. A system according to claim 4 wherein at least two of said search memory fields is each adapted to hold characters each represented in a multi-bit code.

10. A system according to claim 4 wherein at least two of said search memory fields is each adapted to hold characters each represented in a multi-bit code, and at least another of said search memory fields is adapted to hold characters each represented in a single-bit code.

11. A character correlation system comprising:
  (a) a search memory field having a number J of storage locations with each $j$th storage location (where $1 \leq j \leq J$) being adapted to hold and to be interrogated for the presence of any one of a set of characters;
  (b) first means for simultaneously interrogating all of said J storage locations for the presence therein of any particular character;
  (c) a number of J of first output circuits with each $j$th first output circuit being individual to and connected with the respective $j$th storage location and on which can appear during interrogation thereof a first signal indication signifying that said particular character interrogated for is held in said $j$th storage location;

(d) a coincidence matrix having a plurality of elements each adapted to receive a second signal indication and to be interrogated therefor so as to generate a third signal indication, where said plurality of elements are arranged in at least a number $J$ of columns and a number $K$ of rows such that $J \geq K$, each $j$th column having for $1 \leq j \leq K$ at least $j$ elements therein and having for $K \leq j \leq J$ at least $K$ elements therein, and each $k$th row (where $1 \leq k \leq K$) having at least $J+1-k$ elements therein, whereby each said matrix element can be uniquely identified by its column $j$ and row $k$ position;

(e) at least a number $J$ of first input circuits with each $j$th first input circuit being connected to the respective $j$th first output circuit for receiving a said first signal indication and being common to all matrix elements in the respective $j$th matrix column for applying a said second signal indication to each;

(f) second means for selecting any $k$th matrix row and simultaneously interrogating each element therein for a said second signal indication applied thereto;

(g) a number $J$ of second output circuits with each $j$th second output circuit being common to all those matrix elements identified by column as $j+k-1$ and by row as $k$, where $k$ ranges from 1 to K inclusive, for receiving said third signal indications from its said common matrix elements and in turn transmitting a fourth signal indication; and (h) a number $J$ of first counting means with each $j$th counting means being connected with the respective $j$th second output circuit for totalizing the number of times that said fourth signal indications appear thereon.

12. A system according to claim 11 wherein each $j$th first counting means is adapted to signify when its respective fourth signal indication has appeared a predetermined number of times.

13. A system according to claim 11 wherein each $j$th first counting means is adapted for presetting to an initial predetermined count, and there is further included in the system a second counting means connected in common with each $j$th first counting means which is responsive to a some particular final predetermined count in each $j$th first counting means for calculating the total number of said first counting means having a particular final predetermined count.

14. A system according to claim 11 wherein each $j$th first input circuit applies a said second signal indication in response to the receipt of a said first signal indication, and each $j$th second output circuit transmits a said fourth signal indication only in response to the receipt of said third signal indications from all of its common matrix elements that are interrogated.

15. A system according to claim 14 wherein said second means is adapted to select any combination of matrix rows for interrogation at the same time.

16. A system according to claim 11 wherein each $j$th first input circuit applies a said second signal indication in response to the nonreceipt of a said first signal indication, and each $j$th second output circuit transmits a said fourth signal indication only in response to the receipt of said third signal indications from all of its common matrix elements that are interrogated.

17. A system according to claim 16 wherein said second means is adapted to select any combination of matrix rows for interrogation at the same time.

18. A character correlation system comprising:

(a) a number N of search memory fields, each $n$th field (where $1 \leq n \leq N$) having a number $J$ of storage locations with each $j$th storage location thereof (where $1 \leq j \leq J$) being adapted to store and to be interrogated for the presence of any one of a respective $n$th set of characters;

(b) a number N of first means with each $n$th first means being selectively actuable to simultaneously interrogate all $J$ storage locations of the respective $n$th search memory field for the presence therein of any particular character of the respective $n$th set;

(c) control means for selectively actuating any number of said first means;

(d) a number $J$ of first output circuits, with each $j$th first output circuit being connected in common with the respective $j$th storage location of each $n$th search memory field for producing a first signal indication signifying that the said particular character interrogated for by each actuated $n$th first means is found in the respective $j$th storage location of the associated $n$th search memory field;

(e) a coincidence matrix having a plurality of elements each adapted to receive a second signal indication and to be interrogated therefor so as to generate a third signal indication, where said plurality of elements are arranged in at least a number $J$ of columns and a number $K$ of rows such that $J \geq K$, each $j$th column having for $1 \leq j \leq K$ at least $j$ elements therein and having for $K \leq j \leq J$ at least $K$ elements therein, and each $k$th row (where $1 \leq k \leq K$) having at least $J+1-k$ elements therein, whereby each said matrix element can be uniquely identified by its column $j$ and row $k$ position;

(f) at least a number $J$ of first input circuits with each $j$th first input circuit being connected to the respective $j$th first output circuit for receiving a said first signal indication and being common to all matrix elements in the respective $j$th matrix column for applying a said second signal indication to each;

(g) second means for selecting any $k$th matrix row and simultaneously interrogating each element therein for a said second signal indication applied thereto;

(h) a number $J$ of second output circuits with each $j$th second output circuit being common to all those matrix elements identified by column as $j+k-1$ and by row as $k$, where $k$ ranges from 1 to K inclusive, for receiving said third signal indications from its said common matrix elements and in turn transmitting a fourth signal indication; and (i) a number $J$ of third means with each $j$th third means being connected with the respective $j$th second output circuit for determining the number of times that said fourth signal indications appear thereon.

19. A system according to claim 18 wherein said control means can actuate any number of said first means at the same time.

20. A system according to claim 19 wherein said second means is adapted to select any combination of matrix rows for interrogation at the same time.

21. A system according to claim 18 wherein each $j$th third means is adapted to indicate the fact that a particular predetermined number of fourth signal indications have appeared, and said system further includes a fourth means for determining the total number of said third means so indicating.

22. As part of a data processing system, the combination comprising:

(a) search memory structure having a number $J$ of storage locations with each $j$th storage location (where $1 \leq j \leq J$) being adapted to hold any one of a set of multibit code configurations in a manner to generate first magnetic fields indicative of the values of the held code configuration bits;

(b) first means including a plurality of first current windings common to all said $J$ storage locations for simultaneously interrogating all said storage locations for the presence therein of any particular code configuration by establishing identical second magnetic fields at each $j$th storage location which are indicative of the values of the looked-for configuration bits;

(c) a number of J first output circuits with each $j$th first output circuit being individual to the respective $j$th storage location and including both a plurality of magnetic thin films of the single preferred magnetic axis type whose magnetization is influenced by those said first and second magnetic fields present at the $j$th storage location, and a respective $j$th first sense winding inductively coupled with said plurality such that either a null or an active first signal indication is induced thereon during the search field interrogation according to whether the particular looked-for code configuration is respectively present or absent in said $j$th storage location;

(d) a coincidence matrix comprised of an array of bistable magnetic thin films of the single preferred magnetic axis type which are arranged in at least a number J of columns and a number K of rows such that $J \geq K$, each $j$th column having for $1 \leq j \leq K$ at least $j$ films therein and having for $K \leq j \leq J$ at least K films therein, and each $k$th row (where $1 \leq k \leq K$) having at least $J+1-k$ films therein, whereby each said coincidence matrix film can be uniquely identified by its column $j$ and row $k$ position;

(e) at least a number J of first input circuits each including a respective $j$th second current winding operatively connected with the respective $j$th first sense winding for receiving first signal indications therefrom and being inductively coupled with every film in the respective $j$th coincidence matrix column such that current flows therethrough in response to a predetermined kind of first signal indication so as to apply a third magnetic field to each of its said coupled column films which is sufficient to switch it to one of its stable states;

(f) a number K of second means each including a respective $k$th third current winding through which current can be selectively caused to flow in at least one direction, with each $k$th third current winding being inductively coupled with every film in the respective $k$th coincidence matrix row such that current flow therethrough in said one direction applies a fourth magnetic field to each of its said coupled row films which is sufficient to switch it to one of its stable states; and (g) a number J of second output circuits each including a respective $j$th second sense winding inductively coupled to those coincidence matrix films identified by column as $j+k-1$ and by row as $k$, where $k$ ranges from 1 to K inclusive, such that either a null or an active second signal indication is induced thereon during current flow in any one of said third current windings according to whether respectively none or any one of its said coupled films is switched between its stable states.

23. A combination according to claim 22 wherein each $j$th first input circuit responds to an active first signal indication for producing current flow in its $j$th second current winding which switches each coupled $j$th matrix column film to a first stable state; and each $k$th second means is adapted to selectively produce current flow in its respective $k$th third current winding in a direction to switch each coupled $k$th matrix row film to a second stable state.

24. A combination according to claim 22 wherein each $j$th first input circuit responds to an active first signal indication for producing current flow in its $j$th second current winding which switches each coupled $j$th matrix column film to a first stable state; and each $k$th second means is adapted to selectively produce current flow in its respective $k$th third current winding in a direction to switch each coupled $k$th matrix row film to said first stable state.

25. A combination according to claim 22 wherein each $j$th first input circuit responds to an active first signal indication for producing current flow in its $j$th second current winding which switches each coupled $j$th matrix column film to a first stable state; and each $k$th second means is adapted to selectively produce current flow in its respective $k$th third current winding in either a first direction to switch each coupled $k$th matrix row film to said first stable state, or in a second direction to switch each said film to a second stable state.

26. A combination according to claim 22 wherein is further included a counter bank comprising a plurality of bistable magnetic thin film elements of the single preferred magnetic axis type which are arranged in a number J of columns each with a number N of elements; a number J of word windings with each $j$th word winding (where $1 \leq j \leq J$) being inductively coupled with every element of the respective $j$th column such that current flow therein applies a first magnetic field substantially transverse to the preferred magnetic axis of each coupled column element; a number N of drive windings with each $n$th drive winding (where $1 \leq n \leq N$) being inductively coupled with the respective $n$th element in each $j$th column such that current flow therein applies a second magnetic field substantially parallel to the preferred magnetic axis of each coupled $n$th element; a number J of sense windings, with each $j$th sense winding being inductively coupled with every element in the respective $j$th column such that either a first polarity EMF or a second opposite polarity EMF is respectively induced thereon by a reversal of flux parallel to the preferred magnetic axis in any one of its column coupled elements from a first polarized stable direction to a second oppositely polarized stable direction, or from said second stable direction to said first stable direction, respectively; a number J of control means with each $j$th control means being connected to the respective $j$th word winding and selectively actuable to a first state to apply current to generate said first magnetic field; generator means for applying to all of said N drive windings in a predetermined nonoverlapping sequence a like pair of time-separated current pulses each pulse of different polarity and each pulse producing a said second magnetic field of different polarity which has a magnitude sufficient only in the presence of a said first magnetic field to reverse oppositely polarized flux in any $n$th element coupled with the respective $n$th drive winding; a number J of resetting means with each $j$th resetting means being connected to the respective $j$th sense winding for deactuating the respective $j$th control means to a second state in response to only that polarity EMF which can be induced by a reversal of element flux caused by the first of said pair of different polarity current pulses to be applied by said generator means to any $n$th drive; and third means connecting each $j$th control means with the respective $j$th second output circuit such that a particular type of second signal indication causes the former to assume a particular one of its states.

27. A combination according to claim 26 wherein said third means permits a null second signal indication to actuate the respective $j$th control means to its said first state.

28. A combination according to claim 26 wherein said third means permits an active second signal indication to deactuate the respective $j$th control means to its said second state.

29. A combination according to claim 26 wherein said coincidence matrix further includes an additional number of columns equal to $K-1$ with each said additional column having a sufficient number of films therein so that each $j$th second sense winding is inductively coupled with a number K of films, and there is further included an additional number $K-1$ of said first input circuits each having a respective additional second current winding inductively coupled with every film in the respective additional column, and means for selectively producing current flow through any number of said additional second current windings so as to switch each coupled column film to one of its stable states.

30. A counter bank comprising:
(a) a plurality of bistable magnetic thin film elements of the single preferred magnetic axis type which are arranged in a number J of columns each with a number N of elements;
(b) a number J of word windings with each $j$th word winding (where $1 \leq j \leq J$) being inductively coupled with every element of the respective $j$th column such that current flow therein applies a first magnetic field substantially transverse to the preferred magnetic axis of each coupled column element;
(c) a number N of drive windings with each $n$th drive winding (where $1 \leq n \leq N$) being inductively coupled with the respective $n$th element in each $j$th column such that current flow therein applies a second magnetic field substantially parallel to the preferred magnetic axis of each coupled $n$th element;
(d) a number J of sense windings, with each $j$th sense winding being inductively coupled with every element in the respective $j$th column such that either a first polarity EMF or a second opposite polarity EMF is respectively induced thereon by a reversal of flux parallel to the preferred magnetic axis in any one of its column coupled elements from a first polarized stable direction to a second oppositely polarized stable direction, or from said second stable direction to said first stable direction, respectively;
(e) a number J of control means with each $j$th control means being connected to the respective $j$th word winding and selectively actuable to a first state to apply current to generate said first magnetic field;
(f) generator means for applying to all of said N drive windings in a predetermined nonoverlapping sequence a like pair of time-separated current pulses each pulse of different polarity and each pulse producing a said second magnetic field of different polarity which has a magnitude sufficient only in the presence of a said first magnetic field to reverse oppositely polarized flux in any $n$th element coupled with the respective $n$th drive winding; and
(g) a number J of resetting means with each $j$th resetting means being connected to the respective $j$th sense winding for deactuating the respective $j$th control means to a second state in response to only that polarity EMF which can be induced by a reversal of element flux caused by the first of said pair of different polarity current pulses to be applied by said generator means to any $n$th drive winding.

31. A counter bank according to claim 30 wherein output terminals are connected to each $j$th sense winding only across that portion of it which is inductively coupled with the column element to which is last applied, in said predetermined sequence, said pair of drive winding pulses.

32. A counter bank according to claim 30 wherein is further included fourth means for establishing an initial flux direction in each element of at least one of said columns by selectively applying a single current pulse of either polarity to each $n$th drive winding.

33. A counter bank according to claim 30 wherein said generator means can be selectively enabled to apply to said N drive windings in said predetermined sequence either a first like pair of time-separated pulses of first one and then the other polarity, or a second like pair of time-separated pulses of first said other and then said one polarity; and all said J resetting means can be selectively enabled for response to an induced EMF of either polarity.

34. A counter bank according to claim 30 wherein at each magnetic thin film element thereof, the sense winding is comprised of two serially connected and physically parallel conductors of equal length both of which are parallel to and inductively coupled to the same degree with the drive winding but only one of which is inductively coupled with the element.

35. A counter bank comprising:
(a) a plurality of bistable magnetic thin film elements of the single preferred magnetic axis type which are arranged in a number J of columns each with a number N of elements;
(b) a number J of word windings with each $j$th word winding (where $1 < j < J$) being inductively coupled with every element of the respective $j$th column such that current flow therein applies a first magnetic field substantially transverse to the preferred magnetic axis of each coupled column element;
(c) a number N of drive windings with each $n$th drive winding (where $1 < n < N$) being inductively coupled with the respective $n$th element in each $j$th column such that current flow therein applies a second magnetic field substantially parallel to the preferred magnetic axis of each coupled $n$th element;
(d) a number J of sense windings, with each $j$th sense winding being inductively coupled with every element in the respective $j$th column such that either a first polarity EMF or a second opposite polarity EMF is respectively induced thereon by a reversal of flux parallel to the preferred magnetic axis in any one of its column coupled elements from a first polarized stable direction to a second oppositely polarized stable direction, or from said second stable direction to said first stable direction, respectively;
(e) a number J of bistable flip-flops with each $j$th flip-flop being connected to the respective $j$th word winding and being selectively actuable to a first state to apply current therethrough to generate said first magnetic field;
(f) generator means selectively actuable to either a first condition or a second condition for respectively applying to all of said N drive windings in a predetermined nonoverlapping sequence either a first like pair of time-separated current pulses of first one and then the other polarity, or a second like pair of time-separated pulses of first said other and then said one polarity, with each pulse of a like pair generating a said second magnetic field of different polarity which has a magnitude sufficient only in the presence of a said first magnetic field to reverse oppositely polarized flux in any $n$th element coupled with the respective drive winding;
(g) a number J of resetting means with each $j$th resetting means comprising a transformer primary connected to the respective $j$th sense winding, a grounded center-tapped transformer secondary inductively coupled with said transformer primary, first and second AND gates each having one input thereof connected to respective opposite ends of said transformer secondary, and means for applying the output of each said AND gate to the respective $j$th flip-flop such that either places the latter into a second state whereby no current is applied to the respective $j$th word winding; and
(h) control means connected to said generator means to a second input of each of said first and second AND gates in each of the resetting means for selectively actuating said generator means to either its first condition concurrently with enabling said first AND gate of each third means to respond to a signal on its respective portion of said transformer secondary of some predetermined polarity with respect to ground or to its second condition concurrently with enabling said second AND gate of each third means to respond to a signal on its respective portion of said transformer secondary of the same predetermined polarity, where said transformer secondary is wound with respect to said transformer primary so that said predetermined polarity appears to an enabled first or second AND gate only by a reversal of element flux caused by the first of the pair of different polarity current pulses to be applied by said second means to any $n$th drive winding.

36. A counter bank according to claim 35 wherein output terminals are connected to each $j$th sense winding only across that portion of it which is inductively coupled with the column element to which is last applied, in said predetermined sequence, said pair of drive winding pulses.

37. A counter bank according to claim 35 wherein is further included fourth means for establishing an initial flux direction in each element of at least one of said columns by selectively applying a single current pulse of either polarity to each $n$th drive winding.

38. A counter bank according to claim 35 wherein at each magnetic thin film element thereof, the sense winding is comprised of two serially connected and physically parallel conductors of equal length both of which are parallel to and inductively coupled to the same degree with the drive winding but only one of which is inductively coupled with the element.

39. A character correlation system comprising:
   (a) a search memory field adapted to hold a string of characters at different spatially related locations thereof;
   (b) first means for simultaneously interrogating all of said search memory field locations for the presence therein of any particular character;
   (c) a second means operatively connected with said search memory locations and responsive to the interrogation thereof which can generate spatially related first signal indications each signifying that said particular character interrogated for is present in a particular different spatial search memory location;
   (d) third means for generating spatially related reference signals whose total number and spatial relationship can be selectively varied; and
   (e) fourth means for comparing said reference signals simultaneously with each of several different spatially shifted positions of said first signal indications, wherein spatially related second signal indications can be generated each identifying a particular different spatially shifted position of said first signal indications which permit coincidence therewith of said reference signals.

No references cited.

ROBERT C. BAILEY, *Primary Examiner.*

R. B. ZACHE, *Assistant Examiner.*

UNITED STATES PATENT OFFICE
CERTIFICATE OF CORRECTION

Patent No. 3,298,000

January 10, 1967

Richard M. Sanders

It is hereby certified that error appears in the above numbered patent requiring correction and that the said Letters Patent should read as corrected below.

Column 5, line 67, for "conductor" read -- conducted --; column 7, line 2, for "changfie" read -- change --; line 20, for "larger" read -- large --; column 14, line 10, for "matrix 1" read -- matrix row 1 --; column 28, line 17, for "product" read -- produces --; column 30, line 13, for "X, YI and O" read -- X, Y, I and O --; column 34, line 16, for "inducting" read -- inducing --; line 36, for "a", first occurrence, read -- as --; columns 35 and 36, TABLE 5, in the heading to the third column thereof, for "11" read -- Il --; same columns 35 and 36, same TABLE 5, eleventh column, lines 12 to 14 reading down, for "0 1 2" read -- 2 1 2 --; column 39, line 3, for "thin" read -- this --; column 48, line 74, strike out "of", first occurrence; column 54, line 10, for "1<j<J" read -- $1 \leq j \leq J$ --; line 16, for "1<n<N" read -- $1 \leq n \leq N$ --; line 62, after "means", second occurrence, insert -- and --.

Signed and sealed this 24th day of October 1967.

(SEAL)
Attest:

EDWARD M. FLETCHER, JR.
Attesting Officer

EDWARD J. BRENNER
Commissioner of Patents